(12) United States Patent
Sugahara

(10) Patent No.: US 6,683,987 B1
(45) Date of Patent: Jan. 27, 2004

(54) METHOD AND APPARATUS FOR ALTERING THE PICTURE UPDATING FREQUENCY OF A COMPRESSED VIDEO DATA STREAM

(75) Inventor: Takayuki Sugahara, Yokosuka (JP)

(73) Assignee: Victor Company of Japan, Ltd. (JP)

( * ) Notice: Subject to any disclaimer, the term of this patent is extended or adjusted under 35 U.S.C. 154(b) by 0 days.

(21) Appl. No.: 09/521,662

(22) Filed: Mar. 8, 2000

(30) Foreign Application Priority Data

Mar. 25, 1999 (JP) .......................... 11-081250

(51) Int. Cl.[7] ................................. G06K 9/36
(52) U.S. Cl. ..................... 382/235; 382/236; 382/239
(58) Field of Search ......................... 382/235, 236, 382/238, 239, 232; 358/539

(56) References Cited

U.S. PATENT DOCUMENTS 5,757,968 A * 5/1998 Ando ........................ 382/236
6,415,057 B1 * 7/2002 Suzuki et al. ............... 382/239

* cited by examiner

Primary Examiner—Jose L. Couso
Assistant Examiner—Duy M. Dang
(74) Attorney, Agent, or Firm—Parkhurst & Wendel, L.L.P.

(57) ABSTRACT

A method and apparatus for altering the picture updating frequency within an MPEG compressed video data stream replaces the data of each of successive predictively encoded pictures of that data stream, such as all of the B-picture or all of the B-pictures and all of the P-pictures, with copy data which have been stored beforehand in a memory and which designate all of the macroblocks of each such replaced picture as being skipped macroblocks with respect to a corresponding reference picture, thereby ensuring that each such replaced picture will be decoded as a copy of the corresponding reference picture by a MPEG decoder apparatus. Alteration of the picture updating frequency of the stream of pictures expressed by the MPEG data stream can thereby be achieved very simply, while in addition the overall amount of MPEG data can be substantially reduced.

7 Claims, 24 Drawing Sheets

I  B  P

I  P

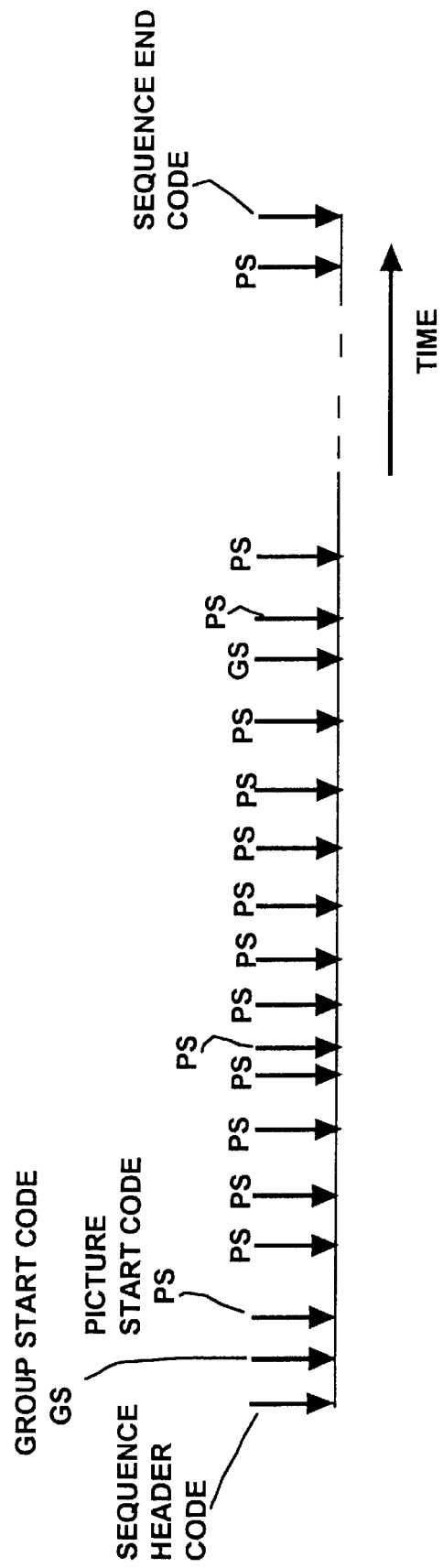

FIG. 10A

PICTURE LAYER

| SYNTAX | NUMBER OF BITS |
|---|---|
| Picture () { | |
|     picture_start_code | 32 |
|     Temporal reference | 10 |
|     picture_coding_type | 3 |
|     vbv_delay | 16 |
|     if (picture_coding_type==2) \|\| (picture_coding_type==3)) { | |
|         full_pel_forward_vector | 1 |
|         forward_f_code | 3 |
|     } | |
|     if (picture_coding_type==3) { | |
|         full_pel_backward_vector | |
|         backward_f_code | |
|     } | |
|     while (nextbits () =='1') { | |
|         extra_bit_picture | 1 |
|         extra_information_picture | 8 |
|     } | |
|     extra_bit_picture | 1 |
|     next_start_code () | |
|     if (nextbits () ==extension_start_code) { | |
|         extension_start_code | |
|         while (nextbits () ! ='0000 0000 0000 0000 0000 0001'){ | 32 |
|             picture_extension_data | 8 |
|         } | |
|         Next_start_code () | |
|     } | |
|     if (nextbits () ==user_data_start_code) { | |
|         user_data_start_code | 32 |
|         while (nextbits () ! ='0000 0000 0000 0000 0000 0001'){ | |
|             user_data | 8 |
|         } | |
|         Next_start_code () | |
|     } | |
|     do { | |
|         Slice () | |
|     } while (nextbits () ==slice_start_code | |

FIG. 10B

SLICE LAYER

| SYNTAX | NUMBER OF BITS |
|---|---|
| slice () { | |
|     slice_start_code | 32 |
|     quantizer_scale | 5 |
|     while (nextbits () =='1') { | |
|         extra_bit_slice | 1 |
|         extra_information_slice | 8 |
|     } | |
|     extra_bit_slice | 1 |
|     do { | |
|         Macroblock () | |
|     } while (nextbits () != '000 0000 0000 0000 0000 0000' ) | |
|     next_start_code() | |
| } | |

FIG. 10C

MACROBLOCK LAYER

| SYNTAX | NUMBER OF BITS |
|---|---|
| macroblock () { | |
|     while (nextbits () =='0000 0001 111') | |
|         macroblock stuffing | 11 |
|     while (nextbits () =='0000 0001 000') | |
|         macroblock escape | 11 |
|     macroblock_address_increment | 1-11 |
|     macroblock_type | 1-6 |
|     if (macroblock_quant) | |
|         Quantizer_scale | 5 |
|     if (macroblock_motion_forward) { | |
|         motion_horizontal_forward_code | 1-11 |
|         if ((forward_f !=1) && | |
|         (motion_horizontal_forward_code!=0)) | |
|         motion_horizontal_forward_r | 1-6 |
|         motion_vertical_forward_code | 1-11 |
|         if ((forward_f !=1) && | |
|         (motion_vertical_forward_code!=0)) | |
|         motion_vertical_forward_r | 1-6 |
|     } | |
|     if ((macroblock_motion_backward) { | |
|         motion_horizontal_backward_code | 1-11 |
|         if (backward_f !=1)&& | |
|         (motion_horizontal_backward_code !=0) | |
|         motion_horizontal_backward_r | 1-6 |
|         motion_vertical_backward_code | 1-11 |
|         if (backward_f !=1)&& | |
|         (motion_vertical_backward_code !=0) | |
|         motion_vertical_backward_r | 1-6 |
|     } | |
|     if (macroblock_pattern) | |
|         coded_block_pattern | 3-9 |
|     for (i=0; i<6; i++) | |
|         Block(i) | |
|     if (picture_coding_type ==4) | |
|         End_of_macroblock | 1 |

FIG. 10D

BLOCK LAYER

| SYNTAX | NUMBER OF BITS |
|---|---|
| block (i)   { | |
|     if (pattern_code[i]) { | |
|         if (macroblock_intra) { | |
|             if (i<4) { | |
|                 dct_size_luminance | 2-7 |
|                 if (dct_size_luminance !=0) | |
|                 dct_dc_differential | 1-8 |
|             } | |
|             else { | |
|                 dct_size_chrominance | 2-8 |
|                 if (dct_size_chrominance !=0) | |
|                 dct_dc_differential | 1-8 |
|             } | |
|         } | |
|         else { | |
|             dct_coeff_first | 2-28 |
|         } | |
|         if (picture_coding_type !=4) { | |
|             while (nextbits() != '10') | |
|             dct_coeff_next | 3-28 |
|             end_of_block | 2 |
|                 } | |
|         } | |
| } | |

FIG. 11

| CODE | SYNTAX | NUMBER OF BITS |
|---|---|---|
| 0000 0000 0000 0000 0000 0001 0000 0000 | picture_start_code | 32 |
| (From MPEG data stream) | temporal reference | 10 |
| 010 (for P-picture) | picture_coding_type | 3 |
| (From MPEG data stream) | vbv_delay | 16 |
| 0 | full_pel_forward_code | 1 |
| 001 | forward_f_code | 3 |
| 0000 000 | stuffing | 7 |
| 0000 0000 0000 0000 0000 0001 0000 0001 | slice_start_code | 32 |
| 0000 1 | quantizer scale | 5 |
| 1 | macroblock_address_increment | 1 |
| 001 | macroblock_type | 3 |
| 0 | motion_horizontal_forward_code | 1 |
| 0 | motion_horizontal_backward_code | 1 |
| 0000 0001 000 (x11) | macroblock_escape(x11) | 121 |
| 0000 0011 001 | macroblock_address_increment | 11 |
| 001 | macroblock_type | 3 |
| 0 | motion_horizontal_forward_code | 1 |
| 0 | motion_horizontal_backward_code | 1 |
| 0000 | stuffing | 4 |
| | TOTAL | 256 bits |

FIG. 12

| CODE | SYNTAX | NUMBER OF BITS |
|---|---|---|
| 0000 0000 0000 0000 0000 0001 0000 0000 | picture_start_code | 32 |
| (From MPEG data stream) | temporal reference | 10 |
| 011 (for B-picture) | picture_coding_type | 3 |
| (From MPEG data stream) | vbv_delay | 16 |
| 0 | full_pel_forward_code | 1 |
| 001 | forward_f_code | 3 |
| 0000 000 | stuffing | 7 |
| 0000 0000 0000 0000 0000 0001 0000 0001 | slice_start_code | 32 |
| 0000 1 | quantizer scale | 5 |
| 1 | macroblock_address_increment | 1 |
| 001 | macroblock_type | 3 |
| 0 | motion_horizontal_forward_code | 1 |
| 0 | motion_horizontal_backward_code | 1 |
| 0000 0001 000 (x11) | macroblock_escape(x11) | 121 |
| 0000 0011 001 | macroblock_address_increment | 11 |
| 001 | macroblock_type | 3 |
| 0 | motion_horizontal_forward_code | 1 |
| 0 | motion_horizontal_backward_code | 1 |
| 0000 | stuffing | 4 |
| | TOTAL | 256 bits |

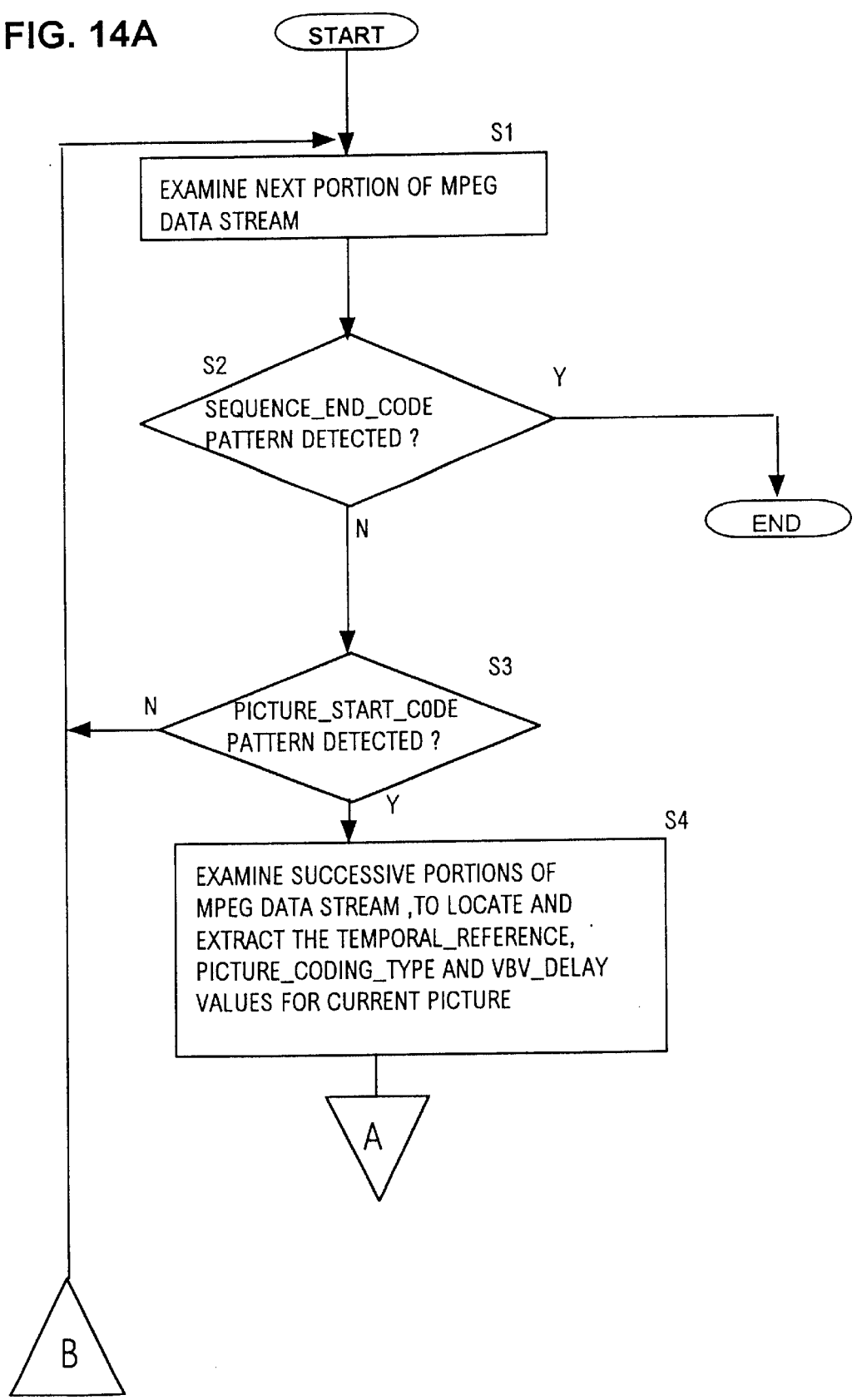

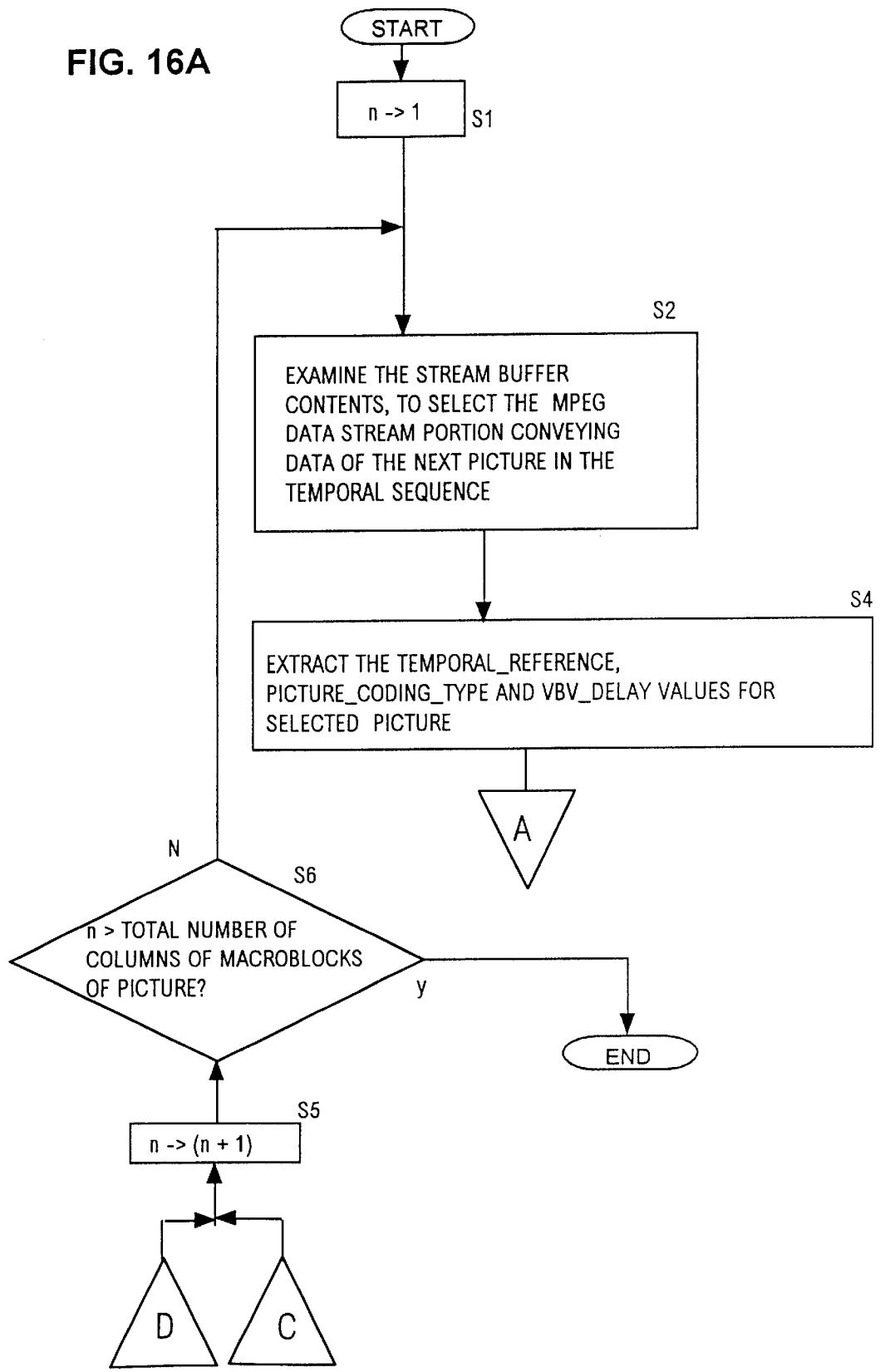

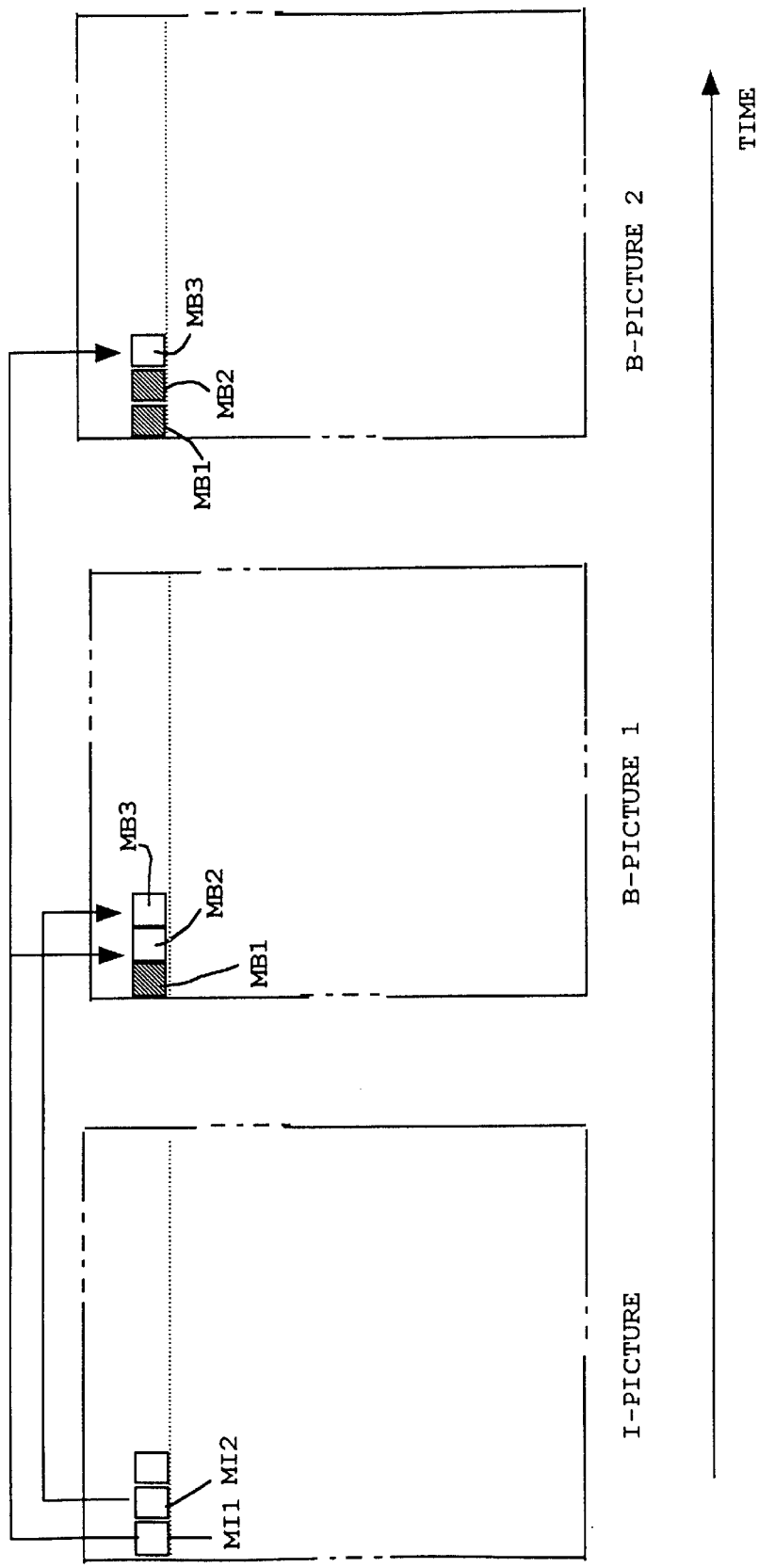

METHOD AND APPARATUS FOR ALTERING THE PICTURE UPDATING FREQUENCY OF A COMPRESSED VIDEO DATA STREAM

BACKGROUND OF THE INVENTION

1. Field of Application

The present invention relates to a compressed data processing method and compressed data processing apparatus, and to a recording and playback system for compressed data, and in particular to such a method, apparatus and system for application to MPEG-encoded compressed data whereby a stream of pictures expressed by the data can be converted to an output picture stream having a reduced frequency of picture updating.

2. Description of Prior Art

Digital technology is widely applied at present in the fields of computers, broadcasting systems, communication systems, data storage systems, etc. A set of international standards for data compression known as MPEG (Moving Pictures Experts Group) has become an important part of such technology. Since the present invention utilizes the MPEG standards, the basic concepts of these will first be outlined. The first MPEG standards for compression of video data were developed by a joint committee known as ISO/IEC JTC1/SC2 of the ISO (International Standards Organization) and IEC (International Electrotechnical Commission) in 1988, where SC2 signifies "scientific subcommittee 2", later changed to SC29.

There are two sets of MPEG standards, MPEG-1 and MPEG-2. MPEG-1 (signifying "MPEG phase 1") is applicable to storage media etc., for transferring data at a rate of approximately 1.5 Mbps. MPEG-1 was developed by applying new technologies to existing types of picture encoding methods, specifically to the JPEG standard which is used for compression-encoding of still pictures, and the H.261 technology (specified by CCIT SGXV standards, now called the ITU-T SG15 standards), developed for compression of pictures in order to transmit the pictures at a low rate of data transfer in such applications as teleconferencing, video telephones, etc. with transmission via a ISDN network. The MPEG-1 standards were first published in 1993, as ISO/IEC 11172. MPEG-2 can be considered as an extension of MPEG-1, and was developed for applications such as data communications, broadcasting, etc., providing features which are not available with MPEG-1 such as an enhanced capability for compression encoding of interlaced-field video signals. The MPEG-2 standards were first published in 1994, as ISO/IEC 1318, H.262. Although embodiments of the invention will be described basically on the assumption of MPEG-1 (referred to in the following simply as MPEG) processing, it will be apparent to a skilled person that the techniques described can be readily adapted to MPEG-2 processing.

FIG. 19 is a general system block diagram showing an example of a basic configuration of an MPEG encoder. The operation will be described first for the case of forward prediction, i.e., deriving encoded data expressing a current input picture based upon the contents of a preceding reference picture, and considering only luminance values. In FIG. 19, data expressing successive ones of a stream of pictures are input to the decoder. Specifically, successive input pixel values of an input picture that is expressed as an array of pixels (for example, one frame of a progressive-scan video signal) are supplied to an adder 2 and a motion compensated prediction section 1. The input picture is pre-processed (in some manner that is not indicated in the drawing) to extract successive 16×16 pixel blocks which are referred to as macroblocks, with the pixel values of the currently extracted macroblock being supplied to the adder 2 and motion compensated prediction section 1. A picture memory 11 holds (as described hereinafter) a set of pixel values expressing a reference picture for use in processing a predictively encoded picture, or may hold a pair of reference pictures which respectively precede and succeed the a predictively encoded picture in the case of bidirectional encoding. With predictive encoding, the motion compensated prediction section 1 successively shifts the input macroblock with respect to the reference picture, within a predetermined search range, to determine whether there is a 16×16 array of pixels within the reference picture which has at least a predetermined minimum degree of correlation with the input macroblock. If such a condition is detected, then the amount and direction of displacement between that 16×16 pixel array in the reference picture and the input macroblock is obtained, as a vector value referred to as a motion vector (specifically, a combination of a horizontal and a vertical motion vector). The respective values of difference between the pixel values (i.e., luminance and chrominance values) of the input macroblock and the correspond pixels within that 16×16 array of pixels in the reference picture (read out from the picture memory 11 and supplied via the motion compensated prediction section 1) are then derived by the adder 2, and supplied to the DCT transform section 3, with these values being referred to as motion compensated prediction error values in the following. Prediction from a preceding reference picture process is referred to as forward prediction, and from a succeeding reference picture is referred to as backward prediction. If no correlated 16×16 block is found within the search range, then the input macroblock is intra-coded within the input picture, i.e., as an intra-coded block, generally referred to as an I-block.

With bidirectional prediction, values for the input macroblock are predicted based on two 16×16 blocks of pixels within a preceding and a succeeding reference picture respectively.

In MPEG, the basic unit for which different types of encoding can be specified is the macroblock. Depending upon the type of picture in which it is located and on decisions made by the encoder, a macroblock may be:

(a) encoded entirely within a picture (i.e., intra-coded), independently of all other pictures,
(b) encoded by forward prediction, i.e., as a set of prediction error values in conjunction with a motion vector, derived using a preceding reference picture,
(b) encoded by backward prediction, i.e., as a set of prediction error values in conjunction with a motion vector, derived using a succeeding reference picture, or
(c) encoded by bidirectional prediction, using both a preceding and a succeeding reference picture.

A picture can be encoded as:

(a) an I-picture, in which case all of the macroblocks are I-macroblocks, i.e., are intra-coded within that picture,
(b) a P-picture, in which case the encoder can selectively apply intra-coding or forward prediction encoding to the macroblocks, or
(c) a B-picture, in which case the encoder can selectively apply intra-coding, forward prediction encoding, backward prediction encoding, or bidirectional prediction to the macroblocks.

To minimize the amount of generated encoded data, the encoder uses an algorithm which is designed to minimize the number of I-macroblocks of the P-pictures and B-pictures.

I-pictures and P-pictures are used as reference pictures, however B-pictures are not so used.

Successive ones of the stream of pictures supplied to the MPEG encoder are encoded as I, P or B-pictures, in a fixedly predetermined sequence. As a picture is encoded, the motion vectors derived for macroblocks are supplied from the motion compensated prediction section 1 to the VLC section 5, as is also prediction mode information which specifies the macroblock type, i.e., whether that macroblock has been encoded by intra-coding, forward prediction, backward prediction, or bidirectional prediction.

The motion compensated prediction error values derived from the adder 2 for a macroblock of the input picture are supplied to a DCT transform section 3, which processes the macroblock as a set of four 8×8 pixel blocks, sometimes referred to as DCT blocks. 2-dimensional DCT (Discrete Cosine Transform) processing is separately applied to each of these DCT blocks to obtain a corresponding set of DCT coefficients, which are supplied to a quantizer 4. This form of processing is efficient, due to the fact that a video signal contains relatively large amounts of low-frequency components and relatively small amounts of high-frequency components, and the low-frequency components can be expressed by the DCT coefficients as relatively small amounts of data.

The quantizer 4 utilizes a 2-dimensional (8×8 value) quantization matrix that is weighted in accordance with human visual characteristics, in conjunction with a quantization scaling value which is applied overall as a scalar multiplier, to obtain a matrix of quantization factors. Each of the DCT coefficients of a DCT block is divided by the corresponding quantization factor, to thereby convert each DCT block to a set of quantized DCT coefficients.

The quantized DCT coefficients produced from the quantizer 4 are supplied to a VLC section 5, and, in the case of an I-picture or P-picture, are supplied to a dequantizer 8, for use in generating a reference picture to be held in the picture memory 11. That is to say, the resultant dequantized DCT coefficients obtained from the dequantizer 8 are supplied to an inverse DCT transform section 9, and each of the resultant recovered motion compensated prediction error values thereby produced from the inverse DCT transform section 9 are added to the corresponding motion-compensated pixel value, produced from the motion compensated prediction section 1, to thereby recover each of the pixel values of that I-picture or P-pictures, which are then stored in the picture memory 11 as a reference picture.

The VLC section 5 applies DPCM (differential pulse code modulation) to the DCT coefficient of a DCT block, which expresses the DC component of the luminance values of that block, while the DCT coefficients expressing the AC components of that DCT block are subjected to zig-zag scanning to enhance the probability of obtaining consecutive sequences ("runs") of zero values, and run-length encoding whereby each of such runs of consecutive zero values can be expressed by a single value, thereby achieving highly efficient encoding. Entropy encoding (typically, Huffman encoding) is then applied, and the resultant variable-length encoded (VLE) data are supplied to a buffer 6, and are produced from that buffer at a constant data rate. The buffer 6 includes a function for detecting the respective amounts of data expressing each of successive macroblocks, and supplies that information to a code amount control section 7. The code amount control section 7 determines the difference between a target amount of code and the actual amount of code used to encode each macroblock, and generates a corresponding control value which is fed back to the quantizer 4, to adjust the quantization scale value that is used by the quantizer 4, such as to ensure that the rate of supplying data to the buffer 6 will not result in buffer underflow or overflow. It can thus be understood that the amounts of data used to encode respective pixels are not constant, but vary substantially as a result of the various encoding operations described above, so that the measures described above are necessary to ensure that underflow or overflow will not occur in the output buffer of the MPEG encoder or in the input buffer of the MPEG decoder.

FIG. 20 is a general system block diagram showing an example of a MPEG decoder for operating on MPEG-compressed video data. In FIG. 20, the input MPEG encoded data are subjected to decoding by a VLD (variable-length decoder) 15, and the resultant data are processed by a dequantizer 16 such as to recover values which are close approximations to the originally derived DCT coefficients, and inverse DCT processing is then applied to these by an inverse DCT section 17. In addition, the motion vector information and prediction mode information for each macroblock are extracted by the VLD 15 from the decoded input data stream, and supplied to a motion compensated prediction section 18. As the data for an I-picture or P-picture are recovered by the decoder, they are successively stored in a picture memory 20, to form a reference picture, whose data are also supplied to the motion compensated prediction section 18. As the recovered motion compensated prediction error value for a pixel of a macroblock is produced from the inverse DCT section 17, then (in the case of forward prediction or backward prediction) it is added to the value of the corresponding pixel from the reference picture that is currently held in the picture memory 20, after motion compensation has been applied to that reference picture by the motion compensated prediction section 18, with the amount of motion compensation being determined by the motion vector for the macroblock that is currently being processed. In that way, successive macroblocks of each of successive P and B-pictures are recovered from the MPEG-encoded compressed data.

An MPEG picture can be encoded as one or more sets of macroblock, referred to as slices. In the simplest case only a single slice is utilized, i.e., constituting all of the macroblocks of a picture.

The output generated by an MPEG encoder is an ordered continuous stream of bits, consisting of successive bit patterns and code values, with sets of stuffing bits inserted where necessary. A multi-layer configuration is utilized, in which successive layers convey information ranging from indications of the start and end points of the MPEG-encoded data stream down to the sets of quantized encoded DCT coefficient values for the respective blocks of macroblocks of a picture. The highest layer is the video sequence layer, containing bit patterns for indicating the aforementioned start and end points of the MPEG data stream, and containing a succession of sets of information relating to respective GOPs ("group of pictures" units), constituting a GOP layer. The term "group of pictures" refers to a sequence consisting of an I-picture followed by a combination of B-pictures and P-pictures, with a typical GOP arrangement being illustrated in FIG. 3. Here, numeral 36 denotes an I-picture at the start of a GOP set which is formed of 12 successive pictures as shown, in the sequence I, B, B, P, B, B, P, B, B, P, B, B, with the P-pictures designated as 37, 38, 39 respectively. The distance (in picture units) M between each pair of reference pictures (I- or P-pictures) is 3, while the length N of the GOP set is 12. Each set of picture layer information contains information relating to each of the slices of that picture, constituting a slice layer, and the slice layer information for each specific slice contains information relating to all of the macroblocks of that slice, as a macroblock layer. Each portion of the macroblock layer relating to a specific macroblock contains encoded DCT coefficients specifying the luminance and chrominance values of the blocks which constitute the macroblock, either directly or as prediction error values.

However if a macroblock has been judged to be identical to the correspondingly positioned macroblock of a reference picture at the time of encoding, then no information is actually encoded for that macroblock, which is referred to as a skipped macroblock. Specifically, a macroblock is indicated as being "skipped", in the MPEG data, by omitting to specify an incremental address value (or any other information) for that macroblock. As a result, referring to the decoder example of FIG. 20, at the time when decoding of such a skipped macroblock is executed, the chrominance and luminance values for the correspondingly positioned macroblock of the reference picture will be read out from the picture memory 20 and transferred unchanged via the motion compensated prediction section 18 and the adder 19 to the output of the decoder.

With such an MPEG system, it is difficult to modify the MPEG-encoded compressed data such as to produce various special effects in the final display picture that is generated from the decoded video data. Examples of such special effects are a "time lapse" effect, i.e., whereby the displayed picture becomes a succession of still pictures rather than a moving picture, so that a form of slow-motion display is achieved, or the "wipe" effect, whereby the displayed picture is gradually shifted off of the display screen. To achieve the "time lapse" special effect in the prior art, it has been necessary to use some dedicated form of special apparatus to process the MPEG-encoded compressed video data prior to supplying the data to an MPEG decoder, i.e., an apparatus having a decoder section for decoding the MPEG data stream, a section for applying processing to the resultant decompressed video data such as to produce the desired "time lapse" effect, and an MPEG compression section for then again applying MPEG-encoding to the resultant data. The resultant MPEG-encoded compressed data can thereafter be decoded by a conventional type of MPEG decoder as described above. To achieve the "wipe" special effect, it has been necessary in the prior art to use a special type of MPEG encoder which has been designed to enable that special effect to be obtained, and to subsequently perform decoding of the resultant MPEG-encoded compressed data using a conventional MPEG decoder.

However such prior art methods of achieving these types of special effect in a finally displayed picture have the disadvantages of causing an increase in the overall system size and complexity, with resultant increases in system costs, operational complexity, etc. There is therefore a need for some simple type of apparatus for achieving such special effects, which could be easily incorporated into an existing MPEG system.

Furthermore, there are many cases in which it would be highly advantageous to convert MPEG-encoded compressed data into an even more highly compressed condition. For example, when a number of entertainment program items (such as respective films, cartoons, etc.) are successively stored by a data recording and playback apparatus on a recording medium, in the form of respective sets of MPEG-encoded compressed data, a condition may occur whereby the storage medium has no more available storage space, but it is desired to store other entertainment program items on that storage medium, without entirely deleting some of the previously stored entertainment program items. In such a case, it would be desirable to be able to recover some available storage space by further compressing the data expressing one or more of the previously recorded entertainment program items, e.g., such as to leave at least a minimum amount of the overall contents of such a previously recorded entertainment program item. However in the prior art, there has been no simple and convenient form of apparatus available for achieving such a function.

SUMMARY OF THE INVENTION

It is an objective of the present invention to overcome the problems of the prior art set out above, by providing a compressed data processing method and compressed data processing apparatus, to be used in conjunction with a conventional type of MPEG encoder and conventional type of MPEG decoder, whereby MPEG-encoded compressed data conveying a stream of pictures can be operated on in a very simple manner to achieve a reduction of the picture updating frequency of that stream of pictures, thereby enabling special effects such as the aforementioned "time lapse" effect to be readily achieved.

It is a second objective of the present invention to provide a compressed data recording and playback method and a compressed data recording and playback apparatus incorporating a conventional type of MPEG encoder and conventional type of MPEG decoder, whereby an amount of recording space available on a recording medium can be increased through further compression of one or more sets of video data which have previously been recorded on the recording medium in the form of MPEG-encoded compressed data, thereby eliminating the need to entirely delete such previously recorded video data sets.

It is a third objective of the present invention to provide a compressed data processing apparatus for processing a selected part of a stream of MPEG-encoded compressed data to convert the part to a condition whereby a final display picture which is generated from a decoded video signal derived from the selected part will undergo successive displacement in a specified direction.

To achieve the first objective, the invention provides a method of reducing the picture updating frequency of a stream of picture data sets expressing respective compression-encoded pictures, where the term "picture updating frequency" of a stream of compression-encoded pictures is used in the description and claims of this invention with the meaning of "frequency of occurrence of sets of data expressing respectively different pictures" within that stream. More specifically, the invention is applicable to a compression-encoded picture stream which includes picture data sets each containing prediction information expressing a compression-encoded picture as being predictively encoded with respect to a predetermined corresponding other one of the compression-encoded pictures as a reference picture. The method basically consists of preparing and storing beforehand a copy data set, which is a set of data whose contents indicate a compression-encoded picture as being identical to the corresponding reference picture, and processing the stream of picture data sets to insert the copy data set to replace the prediction information in each of periodically occurring ones of the predictively encoded compression-encoded pictures.

The method is designed for application to an MPEG compressed video data stream, i.e., in which each of the reference pictures is an MPEG I-picture or P-picture, and each of the predictively encoded pictures is a P-picture or a B-picture. The method can be implemented such that each of the pictures for which prediction information is replaced is a B-picture, and the copy data set includes motion vector information indicating that an overall amount of picture motion of a B-picture with respect to a corresponding temporally preceding or succeeding reference picture is zero, and motion compensated prediction error information indicating that respective amounts of motion compensated prediction error for all macroblocks of the B-picture are zero. That is to say, all macroblocks of the B-picture are indicated as being skipped macroblocks, so that at the time of decoding the MPEG data stream, that B-picture will be decoded as an identical copy of a corresponding reference picture.

Alternatively, the method can be implemented such that the above processing is applied both to the B-pictures and also to each of the P-pictures of the MPEG data stream, or it can be arranged that a user can selectively specify copy data replacement to be executed either for the B-pictures alone or for both the B-pictures and the P-pictures.

The amount of data required to indicate that all blocks of an MPEG encoded picture are skipped macroblocks is very small. Hence, a very substantial reduction in MPEG code amount can be easily achieved. This fact can be used for example to apply further compression to items such as video clips etc., which are recorded as MPEG-encoded compressed data on a recording medium, to avoid the need to completely erase such items when it becomes essential to increase the amount of space available on the recording medium for recording other items. By reading out such a previously recorded item and applying the method described above, the item can be re-recorded in a further compressed condition, thereby providing the desired increase in recording space.

Alternatively stated, the method enables the aforementioned "time lapse" slow-motion effect to be achieved in a very simple manner, since for example it enables all of the B- and P-pictures of each MPEG GOP to be converted to a form whereby each of these will be decoded as a picture that is identical to the I-picture of that GOP, at the time of decoding, or whereby each of the B-pictures will be decoded as a copy of a preceding or succeeding I or P reference picture. Thus, the first objective set out above can be achieved. Furthermore if respective streams of MPEG compressed video data expressing items such as films or video clips have been recorded on a recording medium, and it is required to increase the amount of space available on the recording medium for recording other items, the invention enables the MPEG data of a previously recorded item to be read out, to be processed as described above (i.e., to replace the prediction data of all of the B-pictures with copy data, or replace all of the B-pictures and all of the P-pictures with copy data), and then re-recorded on the recording medium, the desired increase in available space can be achieved without the need to completely erase the previously recorded items. Hence, the second objective set out above can be achieved.

The third objective set out above can be very easily achieved, by a modification of the above compressed data processing method. That is to say, within each of one or more GOPs in a selected part of an MPEG data stream, processing is applied to modify the prediction information of each of the predictively encoded pictures within that GOP such as to specify a fixed size and direction of motion vector with respect to a corresponding reference picture, and to specify all-zero values of motion compensated prediction error for each of the macroblocks of these predictively encoded pictures. As a result, a final display picture which is derived by decoding such a processed GOP will be successively displaced across the display screen, in a direction and at a speed which are determined by the magnitude and direction of the fixed motion vector.

By processing a succession of GOPs in that way, and suitably modifying the intervening I-pictures in such a succession, any arbitrary amount, direction and speed of displacement of a finally displayed picture can be achieved, in a very simple manner.

A compressed data processing apparatus according to the present invention for reduction of the picture updating frequency of an MPEG data stream can be configured as a combination of:

a stream buffer memory for temporarily holding and successive portions of the MPEG compressed video data stream, a copy data memory, such as a ROM, having stored therein a B-picture copy data set containing motion vector information indicating that an overall amount of motion of an MPEG B-picture with respect to a corresponding preceding reference picture or with respect to a corresponding succeeding reference picture is zero, and information indicating that respective amounts of motion compensated prediction error for all macroblocks of the B-picture are zero, a picture data detection section, for detecting each occurrence of the condition in which a set of data expressing a B-picture of the compressed video data stream is currently held in the stream buffer memory means, and a data changeover section which functions, when it is detected that a B-picture data is currently present in the stream buffer memory means, to replace all motion vector information and motion compensated prediction error information of the B-picture data set with the B-picture copy data set.

Alternatively, such an apparatus can be configured with both P-picture and B-picture copy data sets being stored, with the apparatus being selectively controllable for operation in a mode in which only all of the B-picture prediction information is replaced by the copy data and a mode in which both all of the P-picture prediction information and also all of the B-picture prediction information are replaced by copy data.

An apparatus for achieving the third objective set out above can be basically similarly configured, but with the copy data specifying a fixed non-zero size and direction for a motion vector of a predictively encoded picture, and zero amounts of motion compensated prediction error for each of the macroblocks of the picture, and with the apparatus also including means for operating on successive I-pictures such as to produce appropriate amounts of successive displacement of these pictures (with respect to a display screen) when the MPEG data are decoded and displayed.

The above points will be made more clear with reference to the following description of preferred embodiments of the invention.

BRIEF DESCRIPTION OF THE DRAWINGS

FIG. 9 is a conceptual timing diagram for illustrating the relationship between various start code bit patterns of a typical MPEG compressed video data stream;

FIGS. 10A, 10B, 10C and 10D show the syntax and respective numbers of bits of the codes which successively occur within the picture layer, the slice layer, the macroblock layer and the block layer respectively, of the MPEG encoded data of a picture;

FIG. 11 shows an example of the syntax and codes which successively occur in a B-picture copy data set, used with the first or second embodiment;

FIG. 12 shows an example of the syntax and codes which successively occur in a P-picture copy data set, used with the first or second embodiment;

FIGS. 14A, 14B constitute a basic flow diagram of the operation of the first or second embodiment for the case of operation in a second mode, in which replacement of the prediction data of each B-picture and of each P-picture by a copy data set is performed;

FIGS. 16A, 16B, 16C constitute a basic flow diagram of the operation of the third embodiment;

FIG. 17 is a conceptual timing diagram for illustrating the operating principles of the third embodiment;

DESCRIPTION OF PREFERRED EMBODIMENTS

Figure 1:
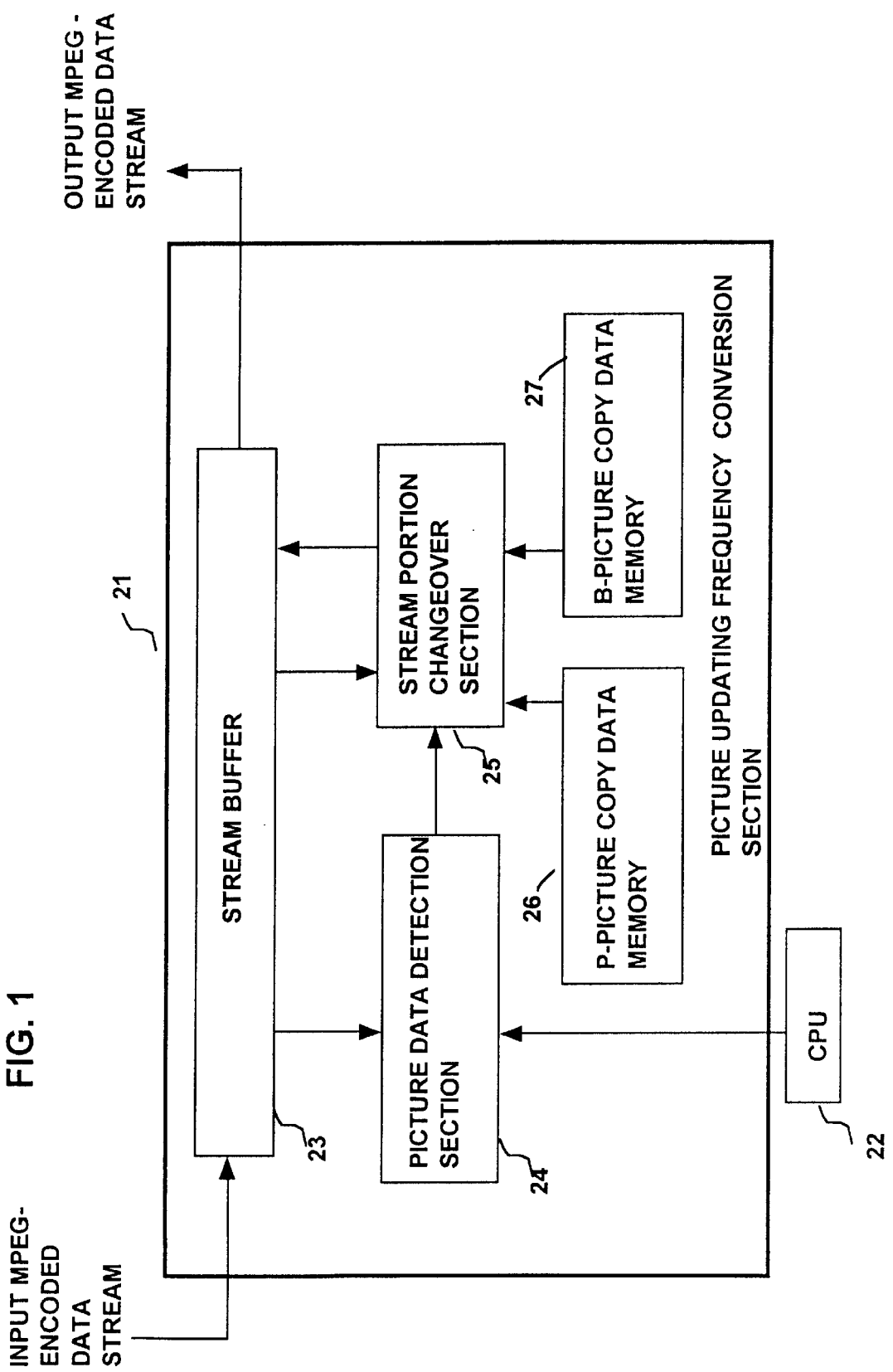
FIG. 1 is a general system block diagram of a first embodiment of a compressed data processing apparatus according to the present invention, for reduction of picture updating frequency of an MPEG data stream, in which copy data for use in replacement of prediction data of encoded pictures are held stored in the apparatus.
Figure 19:
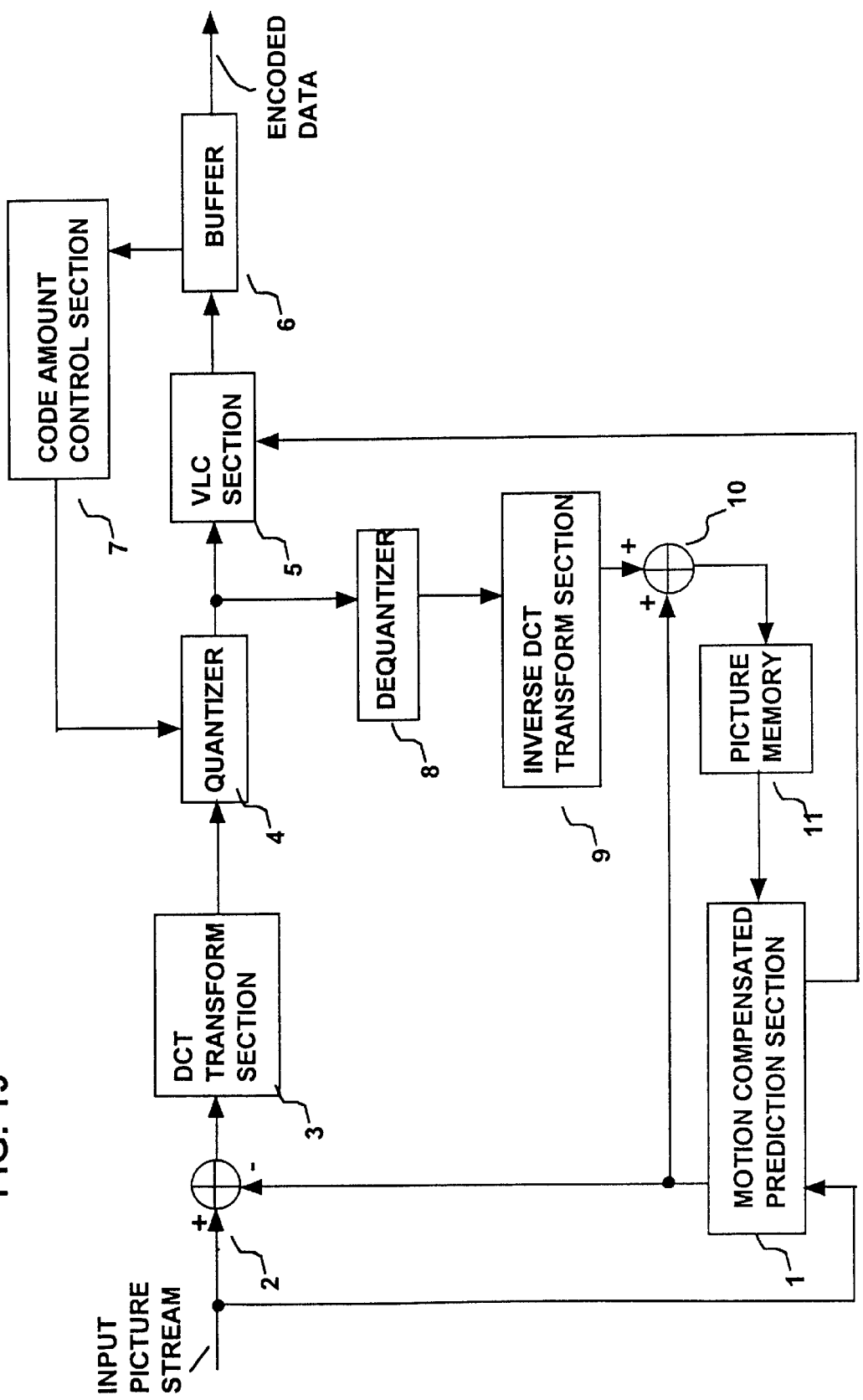
FIG. 19 is a conceptual block diagram for use in describing the principles of operation of a typical MPEG encoding apparatus.

FIG. 1 is a basic system block diagram of an embodiment of a picture updating frequency conversion apparatus according to the present invention for operating on MPEG-encoded compressed data. The apparatus of FIG. 1 is made up of a picture updating frequency conversion section 21 and a CPU 22. The picture updating frequency conversion section 21 is formed of a stream buffer 23, a picture data detection section 24, a stream portion changeover section 25, a P-picture copy data memory 26 and a B-picture copy data memory 27. The input MPEG-encoded data stream (which will be assumed to be MPEG-1 data) which is supplied to the picture updating frequency conversion section 21 has been originally generated by an MPEG encoder such as that described above referring to FIG. 19, and may for example have been read out from a storage medium such as an optical disk, etc., as a playback compressed data stream.

The basic feature of this embodiment is that the apparatus processes all or a specific part of the MPEG-encoded data stream to effect a reduction of the frequency of picture updating of the sequence of pictures expressed by the MPEG-encoded data stream. Two possible processing modes can be applied, as determined by control signals applied by the CPU 22, i.e.,:

(1) a mode in which each bidirectionally encoded picture (B-picture) is converted to a B-picture which is specified as being identical to a preceding reference picture (I-picture or P-picture), or (2) a mode in which each B-picture is converted to a B-picture which is specified as being identical to a preceding reference picture (I-picture or P-picture), and also each P-picture is converted to a P-picture which is specified as being identical to a preceding reference picture (I-picture or P-picture), With MPEG such a condition whereby an encoded picture is indicated as being identical to a preceding reference picture, can be expressed in a simple manner by a very small amount of code, since it is achieved by indicating that all of the macroblocks of the picture are "skipped macroblocks", described hereinabove.

Successive portions of the MPEG-encoded data stream are temporarily held in the picture updating frequency conversion section 21. The picture data detection section 24 operates under the control of the CPU 22 examine to successive portions of the MPEG-encoded data stream as these are set into the stream buffer 23, to detect the sets of data expressing successive encoded pictures within that data stream, and judge the type (i.e., I, P or B) of each encoded picture.

Before describing the operation in more detail, the basic features of the MPEG data stream will be summarized. The addresses of respective macroblocks are specified, within each slice of a picture, as relative (incremental) values with respect to the first macroblock of that slice. The absolute value of each address is obtained by counting along the raster direction, i.e., from left to right along each row of macroblocks, from the top row downwards in succession. The relative address of a non-skipped macroblock within the slice, referred to in the following simply as the macroblock address, or MBA, is obtained by subtracting from that absolute value the MBA of the last non-skipped macroblock. The MBA of the first (top left) macroblock of a slice is fixed as 1, and is always inserted. To specify all of the macroblocks of a slice as being skipped macroblocks, only that first MBA is specified, as the prediction data of that slice.

Figure 20:
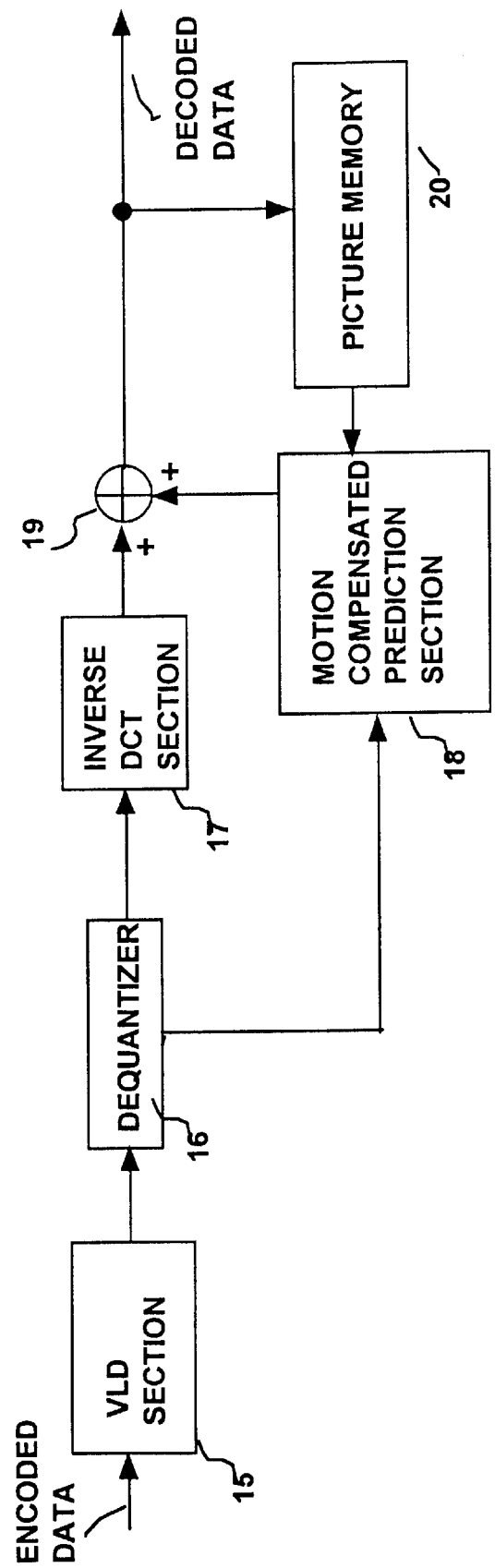
FIG. 20 is a conceptual block diagram for use in describing the principles of operation of a typical MPEG decoding apparatus.

The form in which the information for a picture is conveyed by the MPEG data stream will be described based on an example of a decoding algorithm which could be used by the MPEG decoder of FIG. 20 to extract encoded luminance and chrominance values of intra-coded macroblocks, and encoded prediction difference values and motion vectors of prediction macroblocks, from that data stream. The part of that algorithm which operates on the picture layer data of an encoded picture is shown in FIG. 10A. The picture layer data begins with a bit pattern picture_start_code, having 32 bits. This is followed by a temporal_reference code, which expresses the position of this picture within the original sequence of pictures. In order to simplify decoding, the sequence of the encoded pictures is modified before being produced from the encoder, such that each B-picture is preceded by both of the corresponding reference pictures. That is to say, from the start of an MPEG data sequence, successive pictures (i.e., in the original temporal sequence of the stream of pictures being processed) would be encoded as I-, P- or B-pictures in the order:

I1,B2,B3,P4,B5,B6,P7,B8,B9,P10,B11,B12,I13, , , . . .
and so on, where the numerals correspond to the temporal reference values. However the encoder rearranges and outputs these in the sequence:

I1,P4,B2,B3,P7,B5,B6,P10,B8,B9,I13,B11,B12, . . .

The start of the encoded data of a GOP within the MPEG data stream is indicated by a specific bit pattern (group_start_code), which immediately precedes the data of the I-picture of that GOP. The reference picture for each P-picture, and the pair of reference pictures corresponding to each B-picture, are fixedly predetermined based on the position of that P-picture or B-picture picture within its GOP and the picture type.

FIG. 9 illustrates the occurrence of successive start code bit patterns in a MPEG data sequence. Data relating to a GOP are contained between a group_start_code bit pattern (GS) and the succeeding picture_start_code (PS). All data relating to a picture are contained between a picture_start_code bit pattern (PS) and the succeeding picture_start_code (PS) or group_start_code (GS) pattern. The end of the MPEG data stream is indicated by a sequence_end_code bit pattern.

Referring again to FIG. 10A, the "picture_coding_type" is a code whose value indicates whether this picture is an I-picture, B-picture or P-picture. The vbv_delay is a value relating to the position of the picture data within the MPEG data stream. The full_pel_forward vector and forward_f_code values, are applicable to the case of a P-picture or B-picture, while the full_pel_backward vector and backward_f_code values are applicable to the case of only B-pictures.

The remainder of the picture layer information, extending up to the occurrence of the next picture_start_code or group_start_code within the MPEG data stream, consists essentially of the slice layer information, macroblock layer information, and block layer information relating to that picture.

FIG. 10B illustrates the portion of the decoding algorithm which examines the slice layer information for a picture. Essentially, each time the bit pattern slice_start_code is encountered, the macroblock layer information for that slice is examined (i.e., the information relating to each macroblock that is not a skipped macroblock).

FIG. 10C illustrates the portion of the decoding algorithm which examines the macroblock layer information for a picture slice. The information for each such a macroblock basically consists of (a) The macroblock_address_increment, which is a variable-length code expressing the aforementioned MBA of a non-skipped macroblock, (b) the macroblock_type code, which is a variable-length code whose value indicates whether the macroblock is I-type, P-type or B-type, (c) the quantizer_scale code, indicating the quantization scale factor applied during encoding, (d) codes (motion_horizontal_forward_code, . . . , motion_vertical_forward_r) for specifying the magnitudes of horizontal and vertical motion vectors, in the case of forward prediction from a preceding reference picture, (e) codes (motion_horizontal_backward_code, . . . , motion_vertical_backward_r) for specifying the magnitudes of horizontal and vertical motion vectors, in the case of backward prediction from a succeeding reference picture, and (e) The code coded_block_pattern (specified only in the case of a predictively encoded macroblock), which indicates those of the six blocks (four luminance blocks and two chrominance blocks) which have actually been encoded.

FIG. 10B illustrates the portion of the decoding algorithm which examines the block layer information for a macroblock. If the aforementioned macroblock_type code indicates that this is an I-macroblock, then the encoded DCT coefficients expressing luminance and chrominance values are extracted, while if the macroblock is predictively encoded then the encoded DCT coefficients expressing the prediction error values for each block are extracted, for each of successive blocks of that macroblock.

Figure 5:
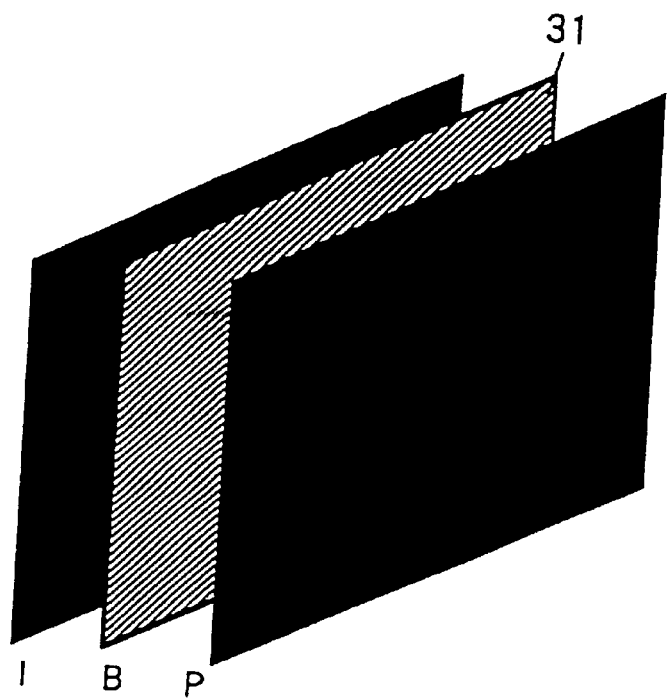
FIG. 5 is a conceptual diagram for use in describing the effect of replacing the prediction data of an MPEG B-picture by a copy data set.

Referring to FIG. 5, this shows a B-picture 31 having as preceding reference pictures an I-picture and a P-picture respectively. With a first mode of operation of this embodiment, such a B-picture is converted by the stream portion changeover section 25 such that all of the macroblocks become skipped macroblocks, with either forward prediction or backward prediction being specified, i.e., the MPEG data of the B-picture 31 are re-encoded as code which expresses a copy of the preceding (in this example, I-type) or succeeding (in this example, P-type) reference picture.

Figure 4:
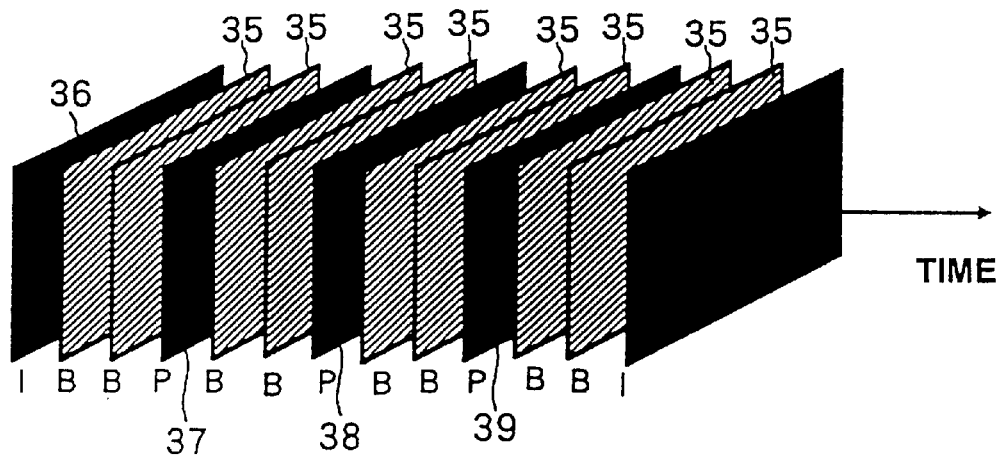
FIG. 4 is a conceptual diagram for illustrating the effect of applying processing by the first or second apparatus embodiment to the MPEG GOP unit of FIG. 3, for the case in which prediction data of each of the B-pictures are replaced by an identical copy data set.

The result is illustrated in FIG. 4 in which, assuming that forward prediction is specified, each of the first pair of B-pictures 35 becomes encoded as a copy of the first I-picture 36, each of the second pair of B-pictures 35 becomes encoded as a copy of the first P-picture 37, each of the third pair of B-pictures 35 becomes encoded as a copy of the second P-picture 38, and each of the fourth pair of B-pictures 35 becomes encoded as a copy of the third P-picture 39.

Figure 6:
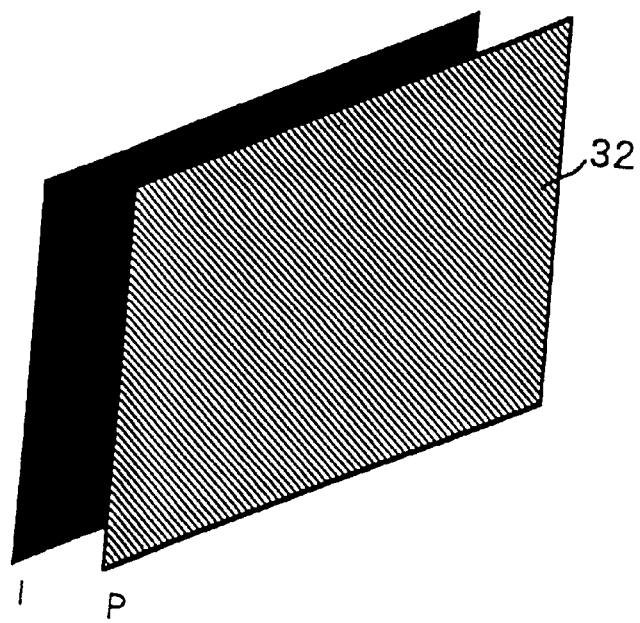
FIG. 6 is a conceptual diagram for use in describing the effect of replacing the prediction data of an MPEG P-picture by a copy data set.

With a second mode of operation of this embodiment, referring to FIG. 6, in addition to such conversion of each B-picture, each P-picture 32 is also converted by the stream portion changeover section 25 such that all of the macroblocks become skipped macroblocks with forward prediction, i.e., the MPEG data of the P-picture 31 are re-encoded as code which expresses a copy of the preceding reference picture.

The result is illustrated in FIG. 7, in which, again assuming that forward prediction is specified for the B-pictures:

each of the first pair of B-pictures 35 and also the first P-picture 40 become encoded as a copy of the first I-picture 36;

each of the second pair of B-pictures 35 and also the second P-picture 41 become encoded as a copy of the first P-picture 40;

each of the third pair of B-pictures 35 and also the third P-picture 42 become encoded as a copy of the second P-picture 41, and each of the fourth pair of B-pictures 35 becomes encoded as a copy of the third P-picture 42.

The overall operation of the embodiment of FIG. 1 is as follows, with the case of the first mode of operation (replacement of B-picture data only) being described first. If the CPU 22 supplies command signals to the picture data detection section 24 designating that copy data replacement processing is to be performed in the first mode, then as successive parts of the MPEG data stream are shifted into the stream buffer 23, the picture data detection section 24 monitors the contents of the stream buffer 23 to detect each occurrence of two successive picture start code patterns, and each occurrence of the picture start code pattern followed by the GOP start code bit pattern, and thereby obtains the start and end positions (stream addresses) of each portion of the MPEG data stream that constitutes the entire data for one picture, i.e. the picture coding type code, picture layer information, slice layer information, macroblock information, etc., described hereinabove, with that data stream portion extending from one occurrence of the picture start code pattern to an immediately succeeding occurrence of that pattern, or from an occurrence of the picture start code pattern up to a subsequent occurrence of the GOP start code pattern.

Each time that a MPEG data stream portion conveying the data for one picture is detected in this way, the picture data detection section 24 extracts the picture_coding_type code to judge if this code indicates a B-picture and if so, extracts the temporal_reference and vbv_delay values from the picture layer information, and provides these values to the stream portion changeover section 25, together with the start and end positions within the MPEG data stream of the stream portion that constitutes the entire information for that picture, and also notifies the stream portion changeover section 25 that the first mode of operation has been designated by the CPU 22.

In response, the stream portion changeover section 25 reads out from the B-picture copy data memory 27 a basic copy stream portion, i.e., containing prediction information which will cause the decoder to generate a copy of the preceding reference picture of that B-picture, but with the temporal_reference and vbv_delay values omitted, and inserts into that copy stream portion the temporal_reference and vbv_delay values which were extracted from the MPEG data stream. The stream portion changeover section 25 then writes the resultant complete copy stream portion into the stream buffer 23, to replace the portion of the MPEG data stream containing the entire information for that B-picture (i.e., extending between two consecutive picture start code patterns or between a picture start code pattern and a GOP start code pattern) with the complete copy stream portion.

FIG. 12 shows an example of actual data values which could be utilized as the basic copy stream portion for a B-picture. Only a single slice_start_code is included, and only the MBA (macroblock_address_increment) for the first macroblock of the picture is specified, thereby expressing the picture as a single slice in which all macroblocks are skipped macroblocks. In addition, the macroblock_type code indicates that all macroblocks are to be decoded by forward prediction, i.e., the reference picture for the macroblocks is the preceding reference picture.

Figure 8:
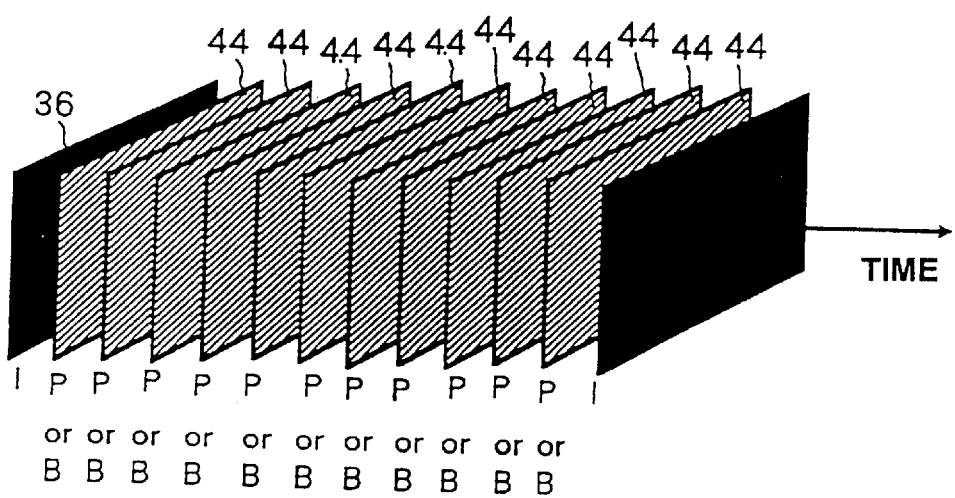
FIG. 8 is a conceptual diagram for illustrating the effect of applying processing by the first or second apparatus embodiment to the MPEG GOP unit of FIG. 3, for the case in which the picture type of each B-picture is changed to that of a P-picture and the prediction data of each of the B-pictures are replaced by an identical copy data set, or the case in which the picture type of each P-picture is changed to that of a B-picture and the prediction data of each of the P-pictures are replaced by an identical copy data set.

If the second mode of copy data replacement processing is designated by the CPU 22, i.e., whereby the data of both B-pictures and P-pictures are to be replaced by respective copy data portions as described referring to FIG. 8 hereinabove, then the picture data detection section 24 notifies this to the stream portion changeover section 25 and also extracts from each portion of the MPEG data stream conveying the data of a P-picture the temporal_reference and vbv_delay values for that picture and supplies these to the stream portion changeover section 25. In that case the stream portion changeover section 25 reads out from the P-picture copy data memory 26 a basic P-picture copy stream portion containing prediction information which specifies that a P-picture is to be decoded as a copy of the corresponding reference present invention (i.e., indicates that all macroblocks of the picture are to be decoded as skipped macroblocks) inserts the extracted temporal_reference and vbv_delay values to obtain a complete copy stream portion, and replaces the previous MPEG data stream portion conveying the data of that P-picture with the complete copy stream portion.

FIG. 11 shows an example of actual data values which could be utilized as the basic copy stream portion for a P-picture. As can be seen, this differs from the basic copy stream portion for a B-picture only with respect to the picture_coding_type code.

Figure 7:
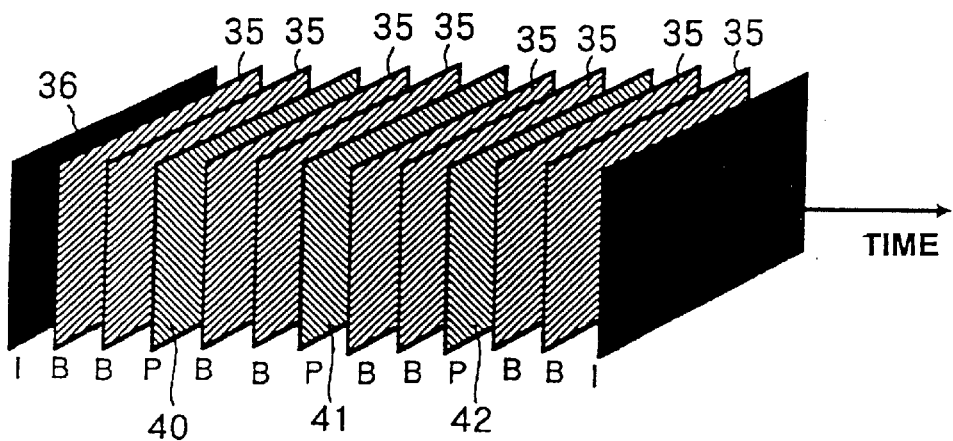
FIG. 7 is a conceptual diagram for illustrating the effect of applying processing the first or second apparatus embodiment to the MPEG GOP unit of FIG. 3, for the case in which the prediction data of each of the B-pictures are replaced by an identical copy data set and the prediction data of each of the P-pictures are replaced by an identical copy data set.

When the first processing mode described above is established by the CPU 22, i.e., only B-pictures are subjected to copy data replacement, the frequency of picture updating is reduced to become ⅓ of the normal MPEG frame rate of approximately 30 frames (pictures) per second, since picture updating only occurs once in every three successive pictures. That is, the picture updating frequency becomes approximately 10 Hz. With the second processing mode, whereby both B-pictures and P-pictures are subjected to copy data replacement, the frequency of picture updating is reduced to become 1/12 of the normal MPEG frame rate, since as illustrated in FIG. 7, picture updating only occurs once in every twelve successive pictures. That is, the picture updating frequency becomes approximately 2.5 Hz.

As can be understood from the examples of FIGS. 11 and 12, the total amount of code constituting a copy stream portion is very small, e.g., approximately in the range of 256 bytes to 1 KB.

Figure 3:
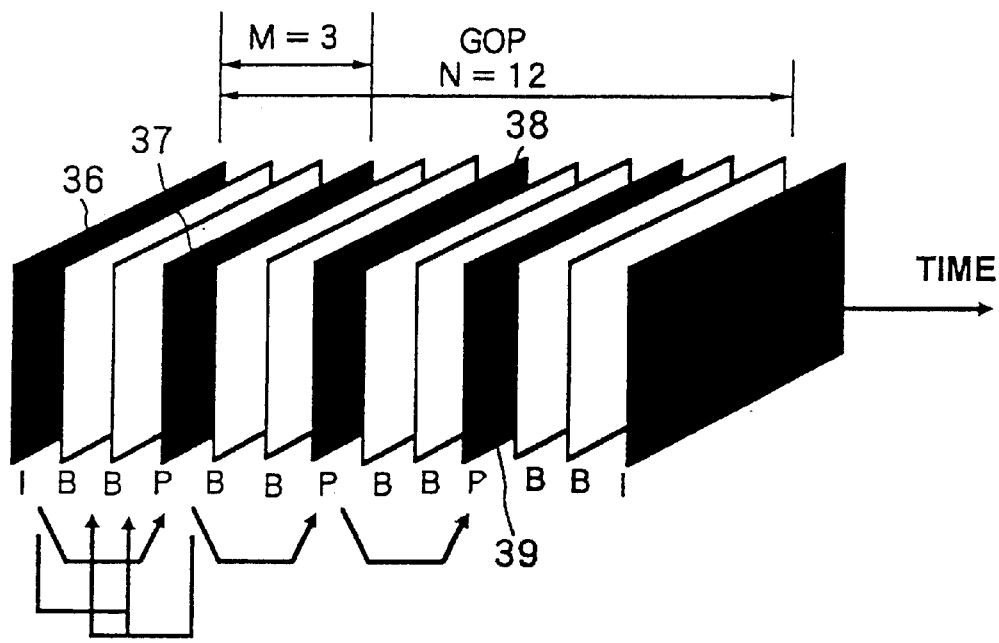
FIG. 3 is a conceptual diagram for illustrating a typical configuration of a GOP (Group of Pictures) unit of an MPEG compressed video data stream.

Specifically, with the first processing mode described above, in which only the B-pictures are subjected to copy data replacement, the total amount of code of an MPEG-encoded compressed data sequence is reduced to approximately 52% of the original amount, assuming that the GOP configuration shown in FIG. 3 (M=3, N=12) is used, and that the relative proportions of the average amounts of code of the I, P and B-pictures are 5:4:2. If the second processing mode is applied (both B and P-pictures subjected to copy data replacement), then the amount of MPEG-encoded compressed data is reduced to approximately 16% of the original amount.

Furthermore, since no processing such as dequantization/requantization is applied, as is necessary with prior art types of apparatus for achieving such a special effect, there is no coarsening of the quantization levels of the data expressing pixel luminance and chrominance values, and a consequent lowering of the final displayed picture resolution, as would occur if such a prior art type of apparatus were to be used to achieve a reduction of the picture updating frequency.

An alternative method of achieving the effects of the second processing mode described above can be envisaged, as illustrated in FIG. 8. In this case, all of the P-pictures and all of the B-pictures are subjected to copy data replacement, such as to be all converted to P-pictures. Alternatively, the copy data replacement could be performed such as to convert all of these to B-pictures. In that case, the picture updating frequency would again become approximately 2.5 Hz. Conversion of a B-picture to a P-picture can be achieved by reading out the P-picture copy data stream portion from the P-picture copy data memory 26 and using that to replace the B-picture data in the MPEG data stream. However in that case it would not be possible to simply insert the extracted temporal_reference value of that B-picture into the copy stream portion. This is due to the fact that the MPEG decoder apparatus may detect, as an error condition, any occurrence of a P-picture within a GOP when, according to its temporal_reference value in relation to the position of the GOP in the MPEG stream, the picture should actually be a B-picture. For that reason, it would be necessary to insert altered temporal_reference values into the copy stream portions for such B-pictures. A similar problem exists if all P-picture stream portions are to be converted to B-pictures copy stream portions. Thus, such a method leads to additional processing becoming necessary.

If all P-pictures are converted to B-pictures in that way, then it becomes possible to specify either forward prediction or backward prediction, in the copy data stream portion.

Figure 13A:
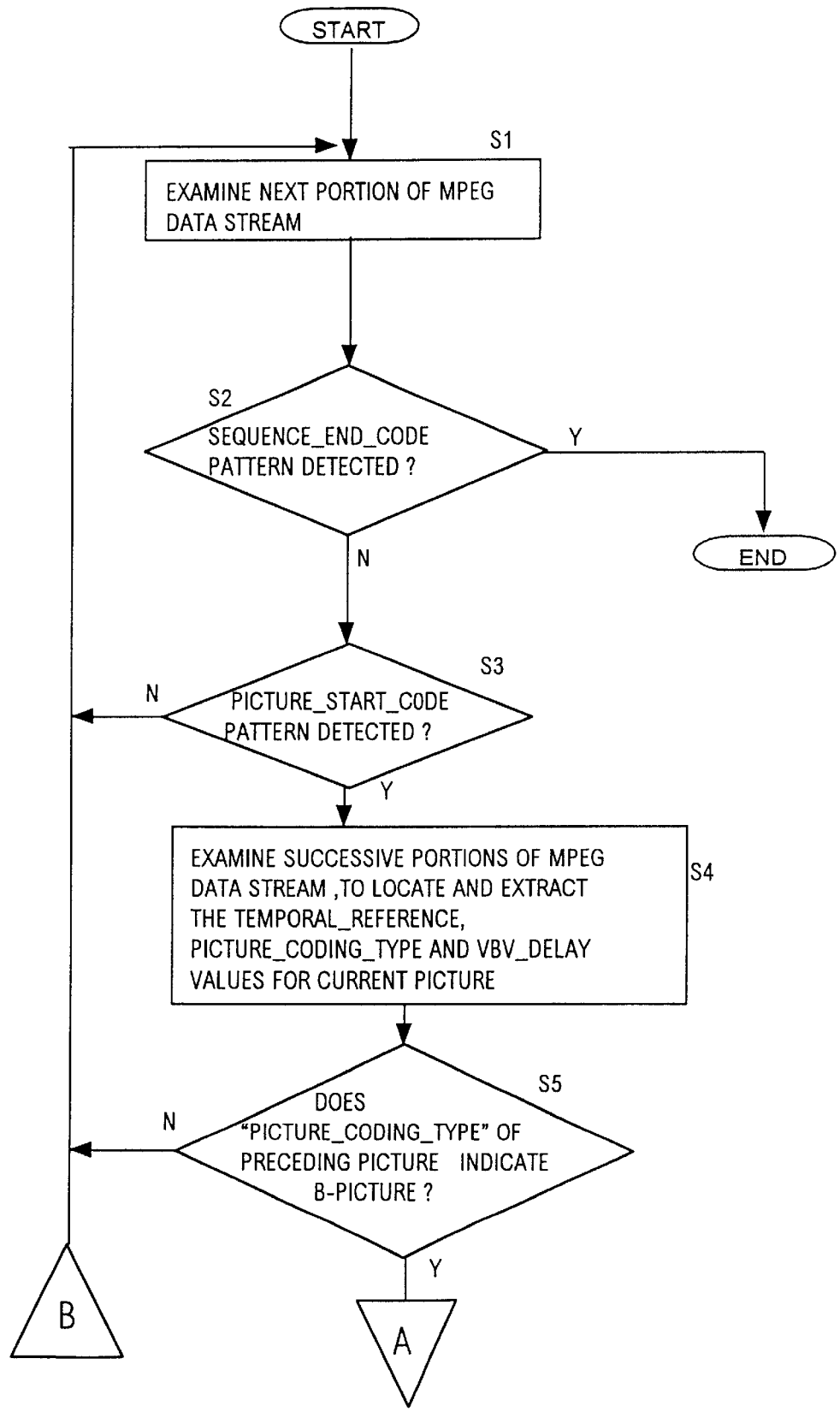
FIGS. 13A, 13B constitute a basic flow diagram of the operation of the first or second embodiment for the case of operation in a first mode, in which only replacement of the prediction data of each B-picture by a copy data set is performed.
Figure 13B:
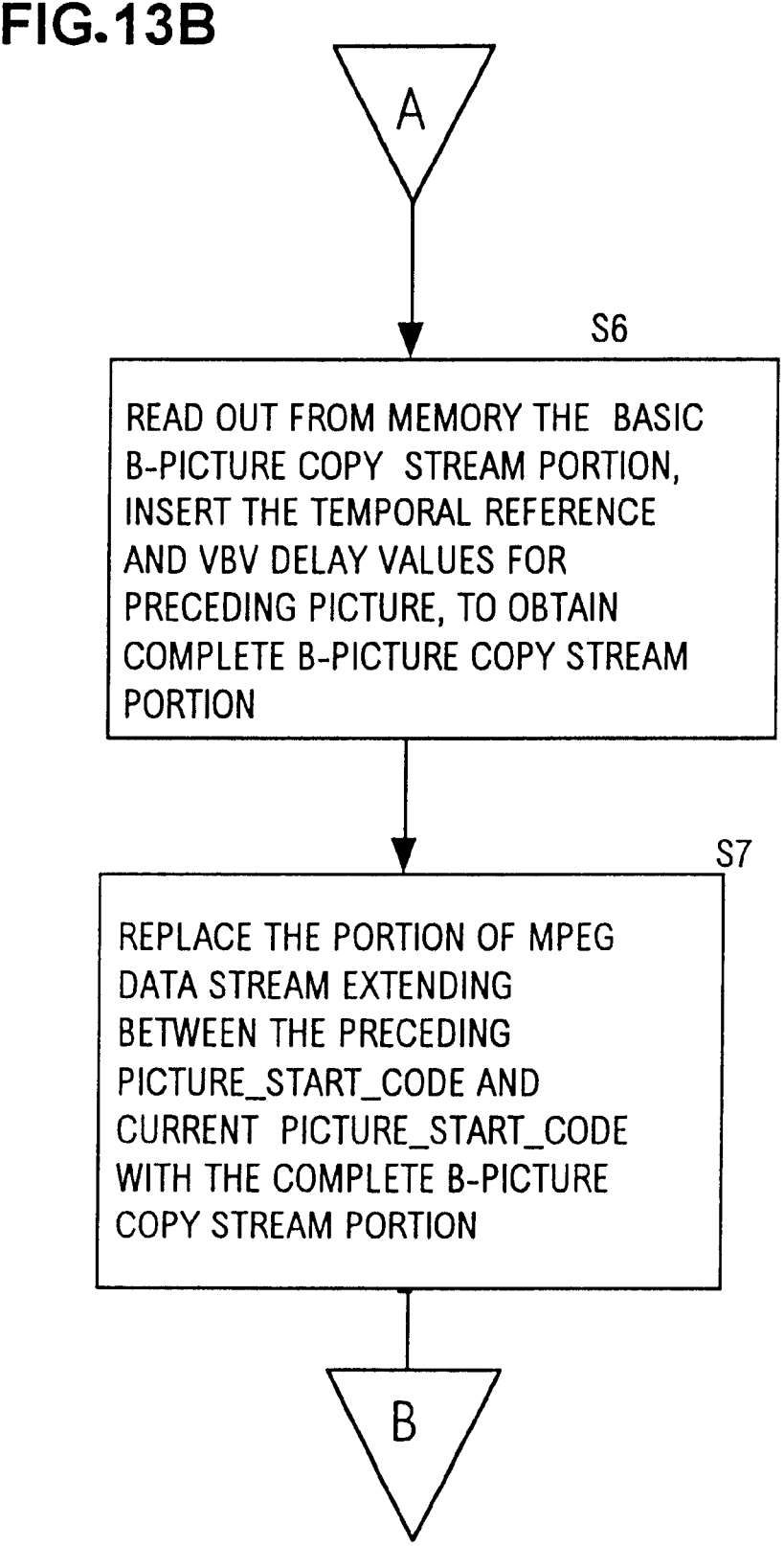

FIGS. 13A and 13B constitute a simple flow diagram illustrating the processing which is executed by the apparatus of FIG. 1, when the first processing mode is specified by the CPU 22, i.e., when only replacement of the data of each of the B-pictures is to be performed. As described above, each MPEG data stream portion conveying all of the data for one picture is located between two successive picture start code bit patterns or between a picture start code pattern and a subsequent group start code pattern. However in order to simplify understanding of the diagram, detection of group start code patterns is omitted from the diagram. It will be assumed that transfer of the MPEG data stream to the stream buffer 23 begins after the CPU 22 has designated to the picture data detection section 24 that copy data replacement processing in the first mode is to be started. In successive executions of step S1, respective portions of the MPEG data stream are examined by the picture data detection section 24 as they are shifted into the stream buffer 23, to detect each position of occurrence of the picture start code pattern in step S3 (if the sequence end code pattern is not detected on step S2). When the picture start code pattern is detected, the picture data detection section 24 then examines the immediately succeeding portion of the MPEG data stream, to determine the picture type from the picture_coding_type code and to locate and extract the vbv_delay and temporal_reference values of the picture in step S4 (it is of course actually only necessary to do this in the case of the picture type being found to be a B-picture). The latter picture will be referred to as the current picture. Step S5 is then executed, in which a decision is made as to whether the picture (referred to in the flow diagram as the "preceding picture", with the picture start code pattern at the start of the data of that preceding picture being referred to as the "preceding picture start code") whose data were detected immediately prior to that current picture is a B-picture. If so, then operation proceeds to step S6, in which the basic B-picture copy stream portion is read out from the B-picture copy data memory 27, and the extracted temporal_reference and vdv_delay values of the preceding picture are inserted into the basic B-picture copy stream portion to obtain a complete copy stream portion. Step S7 is then executed, in which the portion of the MPEG data stream extending between the preceding picture start code (as defined above) and the current picture start code is replaced by that complete B-picture copy stream portion.

Operation then returns to step S1.

Although not shown in the flow diagram, if a GOP start code pattern is detected and the picture whose data immediately precedes that start code pattern is a B-picture, then in steps S6, S7, the portion of the MPEG data stream extending from the preceding picture start code to the GOP start code pattern is replaced with the complete B-picture copy stream portion as described above.

Figure 14B:
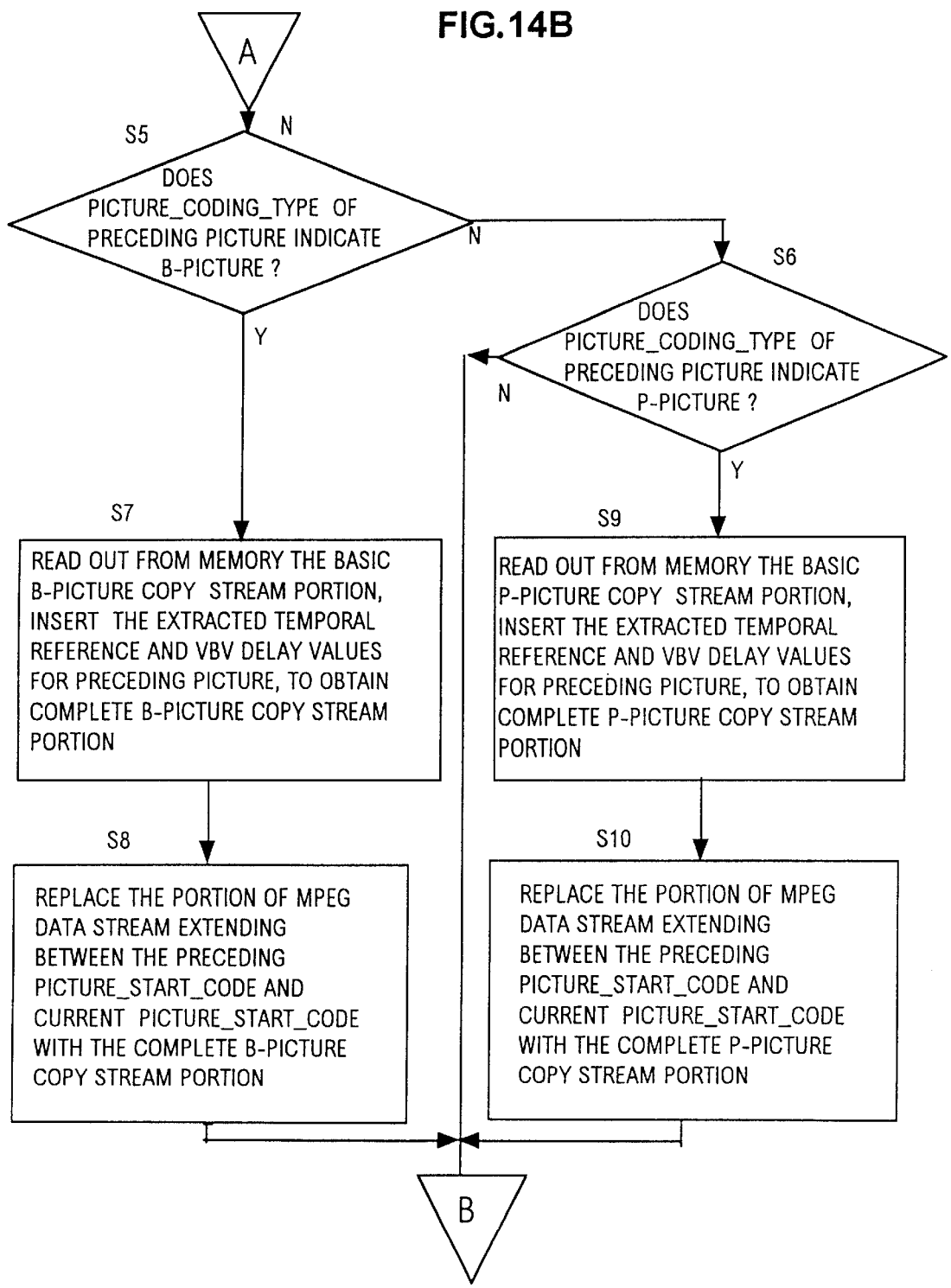

FIGS. 14A and 14B constitute a simple flow diagram illustrating the processing which is executed by the apparatus of FIG. 1 when the second processing mode is specified by the CPU 22, i.e., when replacement of the data of each of the B-pictures and P-pictures is to be performed. In this case, when it is detected in step S5 that the preceding picture was a B-picture then the steps S7, S8 are executed in the same manner as described for the flow diagram of FIGS. 13A, 13B. If it is found in step S6 that the preceding picture was a P-picture then the steps S9, S10 are executed. The basic P-picture copy stream portion is read out from the P-picture copy data memory 26, and the extracted temporal_reference and vdv_delay values of the preceding picture are inserted into the basic P-picture copy stream portion to obtain a complete P-picture copy stream portion. Step S10 is then executed, in which the portion of the MPEG data stream extending between the preceding picture start code (as defined hereinabove) and the current picture start code is replaced by the complete P-picture copy stream portion.

Operation then returns to step S1.

It should be understood that the above flow diagrams are provided for the purpose of illustrating the basic principles of operation of the apparatus embodiment shown in FIG. 1, and that other sequences of operations could of course be utilized.

Figure 2:
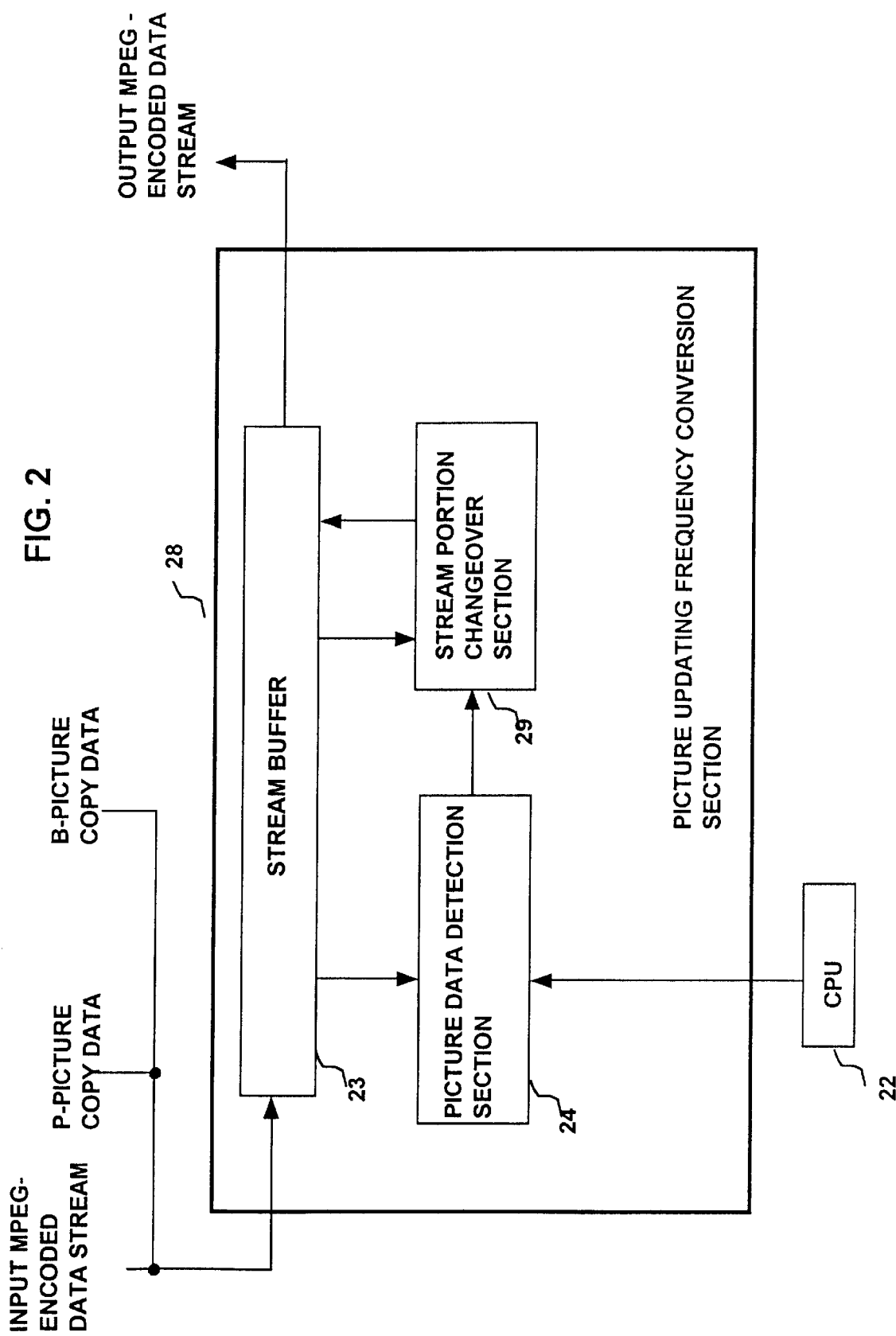
FIG. 2 is a general system block diagram of a second embodiment of a compressed data processing apparatus according to the present invention, in which copy data for use in replacement of prediction data are supplied to the apparatus from an external source when required.

A second embodiment of a picture updating frequency conversion apparatus according to the present invention is shown in the general system block diagram of FIG. 2. In this case, instead of the basic P-pictures and B-picture copy stream portions being stored fixedly at the conversion apparatus, e.g., in a ROM (read-only memory), these are transferred from an external source to the picture updating frequency conversion apparatus before transmission of an MPEG data sequence begins, and can for example be read out from the stream buffer 23 and temporarily held in an internal register (not shown in the drawing) within the stream portion changeover section 29 of this embodiment. In all other respective, the operation of this embodiment is identical to that of the preceding embodiment.

As can be understood from the above description, the above embodiments enable the "intermittent motion" type of special effect to be very easily implemented. In particular with these embodiments, it is unnecessary to determine the respective temporal positions of encoded pictures within the MPEG data stream as specified by the respective temporal_reference values (which, as described above, may differ from the sequence of encoded pictures produced from the MPEG encoder) and to control the processing in accordance with these temporal positions. Furthermore since there is no decoding/re-encoding processing applied to the pixel data, there is no lowering of resolution of the finally displayed pictures due to coarsening of the quantization levels, as will occur with prior art types of apparatus which apply such processing.

The use of copy stream portions for replacement of prediction pictures of an MPEG data stream to produce special effects in a very simple manner is not limited only to the conversion of prediction pictures (B-pictures, or B-pictures and P-pictures) to direct copies of the corresponding reference pictures, as achieved with the embodiments of the invention described above. For example, if the second mode of processing described above is modified such that each P-picture copy stream portion and B-picture copy stream portion specifies a picture as having a fixed non-zero motion vector in a fixed direction, and all of the P and B-pictures of a GOP are subjected to copy data replacement, then the result will be that the final displayed picture will be successively shifted across the display screen, in the direction of the motion vector, when that GOP is decoded and a resultant video signal generated.

When producing such an effect, it is desirable to modify the MPEG data stream such as to produce successively changing blank regions within the parts of the display screen which are successively vacated by the actual display picture, i.e. to insert I-macroblocks having fixed luminance values, to replace those macroblocks which no longer correspond to the contents of a reference picture. A third embodiment of the invention will be described in the following whereby such a special effect is achieved, taking as an example the case in which the final display picture is to be successively moved horizontally from left to right across the display screen in units of macroblocks.

Figure 15:
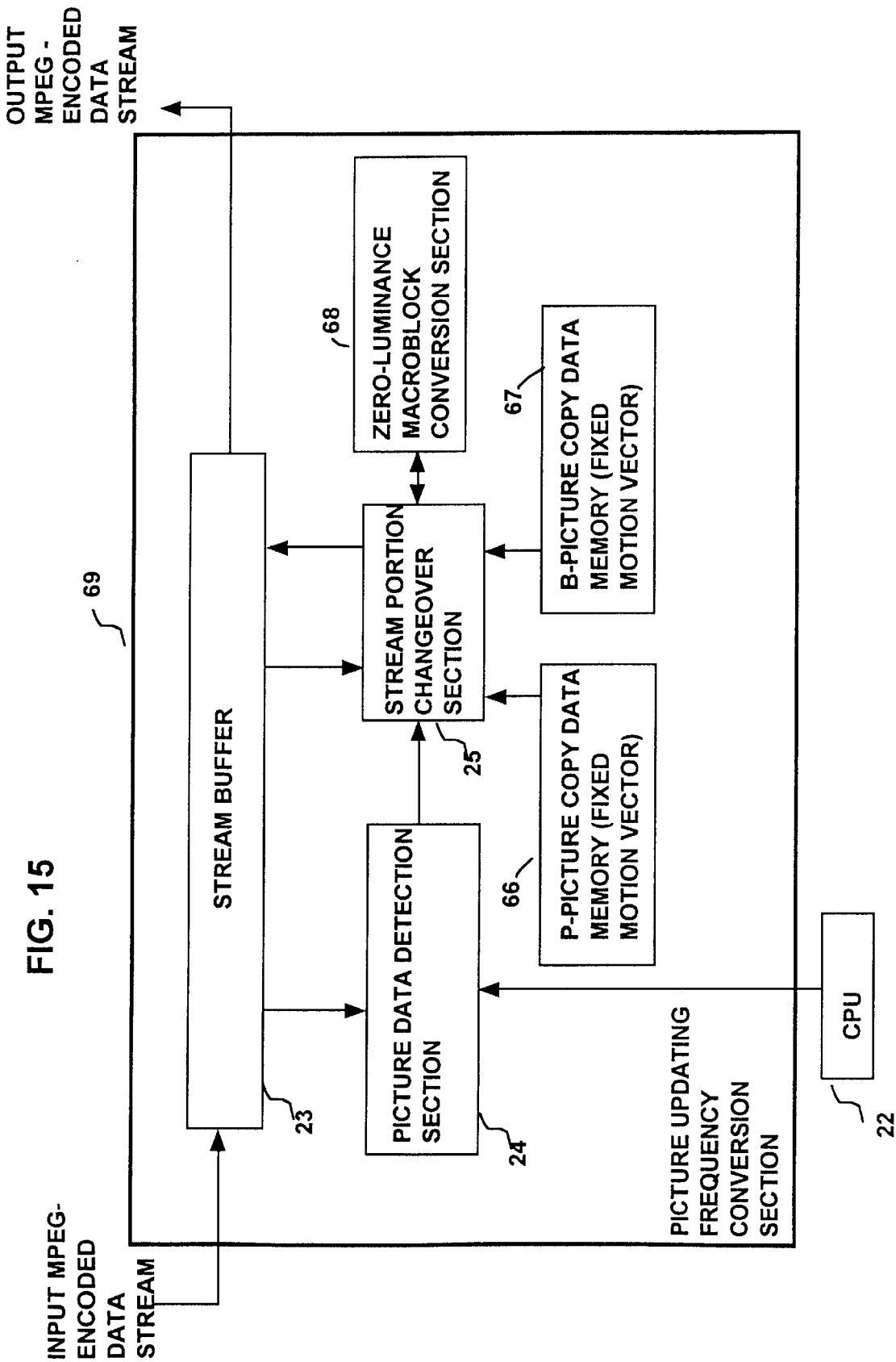
FIG. 15 is a general system block diagram of a third embodiment of a compressed data processing apparatus according to the present invention, whereby a selected part of an MPEG data stream is processed such as to produce successive displacement of a finally displayed picture which is generated through decoding of the selected part.

The embodiment is configured to produce a blank region (assumed in the following to be an all-black region) within the final display picture which successively extends laterally from one side to the other side of the display in synchronism with the lateral shifting of the display picture. FIG. 15 is a general system block diagram showing this embodiment, which differs from that of FIG. 1 in that the picture updating frequency conversion section 69 includes a P-picture copy data memory 66 and a B-picture copy data memory 67 each containing a copy data stream portion which specifies a fixed magnitude and direction of a motion vector, and a zero-luminance macroblock conversion section 68. In the following, macroblocks whose MPEG-encoded data are modified such as to produce an all-black region in the final display picture will be referred to as zero-luminance macroblocks.

With this embodiment, the zero-luminance macroblock conversion section 68 operates on a copy stream portion that is read out from the P-picture copy data memory 66 or B-picture copy data memory 67, or on the MPEG data stream portion expressing an I-picture (extracted from the stream buffer 23), to replace the macroblock layer information of each of certain macroblocks with that of a zero-luminance macroblock by:

(a) setting the variable-length macroblock_type code as that of an I-macroblock for which the parameter macroblock_quant is zero, i.e., by setting macroblock_type as a single bit, of value 1, (b) in the block layer information for the macroblock, for each of the four luminance blocks of the macroblock, specifying only the DC level parameter (dct_dc_size_luminance), as zero, while for each of the two chrominance blocks of the macroblock, specifying only the DC level parameter (dct_dc_size_chrominance), as 128.

Figure 16B:
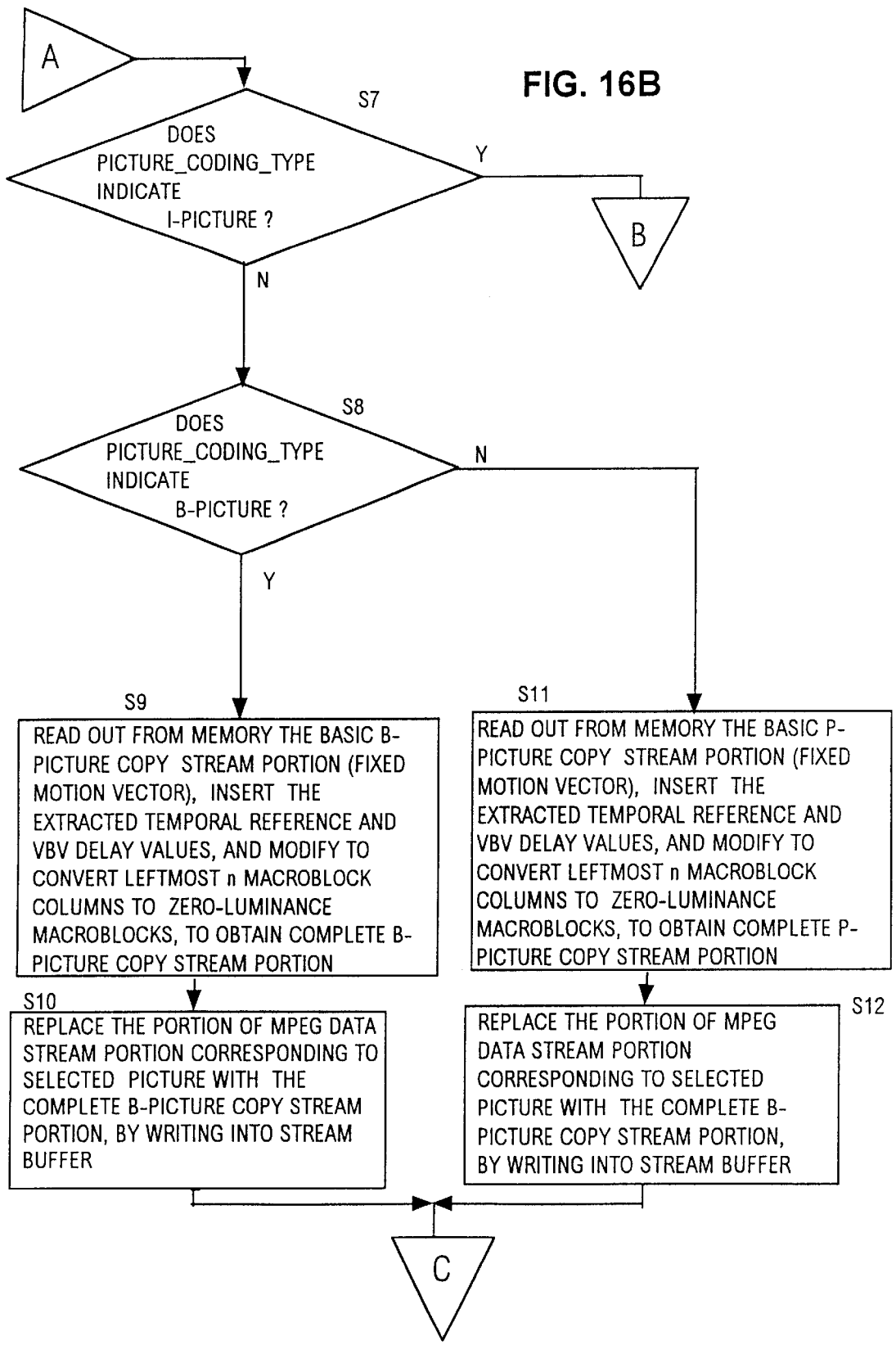
Figure 16C:
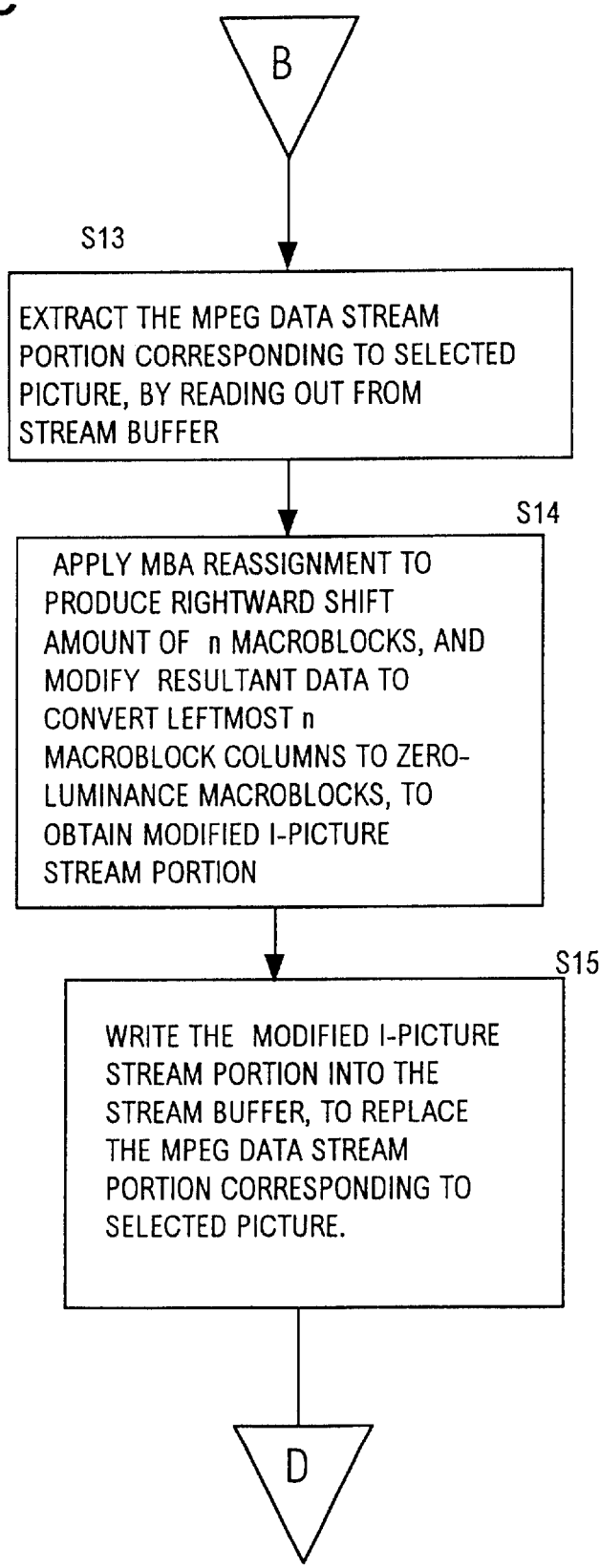

FIGS. 16A, 16B, 16C constitute a flow diagram of the operation of this embodiment, which will be described assuming that the size of the fixed motion vector is 16 pixels, i.e., the width of a macroblock, with the vector direction being horizontal, from left to right, with that motion vector being inserted into the prediction data of each of the predictively encoded pictures of each of a plurality of successive GOPs, to produce successive lateral shifting of the final display picture as described above, and with zero-luminance macroblocks being inserted to produce successive blacking out of increasing numbers of columns of macroblocks of a finally displayed picture, moving from left to right until the entire displayed picture has been shifted off of the display screen In the flow diagram of FIGS. 16A, 16B, 16C it is assumed that the operation starts when the CPU 22 designates that the successive shifting and black-out processing is to be started. A counter value n is first initialized to 1 in step S1. In each execution of step S2, the contents of the stream buffer 23 are monitored to locate the MPEG data stream portion conveying the next picture in the original temporal sequence, e.g., by examining the temporal_reference values of successive encoded pictures, whose respective MPEG data stream portions are located by detection of successive start code patterns as described for the preceding embodiments. In step S4, the picture_coding_type, temporal_reference, and vbv_delay values of the selected picture are extracted from the MPEG data stream portion. The picture_coding_type code is judged to determine the picture type, and if it is found to be a B-picture (step S7, N, step S8, Y), then steps S9, S10 are executed. In step S9, a basic B-picture copy stream portion which specifies the respective MBAs of each of the macroblocks of the picture, specifies the aforementioned identical amount and direction of horizontal motion vector for each of the macroblocks, and zero prediction error for each of the macroblocks, is read out from the B-picture copy data memory 67. That copy stream portion is then modified in step S10, to express each of the macroblocks constituting the leftmost n columns of macroblocks of the picture as respective zero-luminance I-macroblocks by modifying the block layer information for each macroblock in the manner described hereinabove. In addition, the extracted temporal_reference and vbv_delay values are inserted, in the same way as described for the first embodiment, and the resultant complete B-picture copy stream is then written into the stream buffer 23 to replace the original MPEG data stream portion conveying the selected picture.

If the selected picture is found to be a P-picture (step S7, N, step S8, N) then similar operations to those described above are performed in steps S11, S12, by modifying a basic P-picture copy stream portion having the aforementioned fixed value of horizontal motion vector and zero prediction error specified for each of the macroblocks, which is read out from the P-picture copy data memory 66.

If the selected picture is found to be an I-picture (step S7, Y), then steps S13, S14, S15 are executed. In step S13, the data of that picture are read out from the stream buffer 23, and in step S14 the MBAs assigned to respective macroblocks are altered such as to produce a total amount of leftward shift of the picture that is equal to n macroblocks (i.e., n×16 pixels). For example, if the current value of n is 1, the MBA of the first macroblock of the first slice (i.e., leftmost side of the top row of macroblocks) would be changed from 1 to 2, the MBA of the second macroblock would be changed from 2 to 3, and so on. All of the MBAs corresponding to the n leftmost columns of macroblocks of the picture are then assigned to zero-luminance macroblocks, as described above, and the resultant complete data stream portion is then written into the stream buffer 23 to replace the MPEG data stream portion for that I-picture, in step S15.

Each time step S10, S12 or S15 has been executed, operation returns to step S5 in which the counter n is incremented, and if n has not reached a value equal to the total number of columns of macroblocks constituting a picture (step S6, N), operation returns to step S2, to then select and process the next picture in the temporal sequence.

The result of decoding a portion of a MPEG data stream which has been processed as described above is illustrated in FIG. 17. Here, it is assumed that the first three pictures of a GOP are successively operated on by an MPEG decoder apparatus such as that of FIG. 20 described above, and that prediction data replacement using a fixed right-directed vector of 1 macroblock width has been applied starting from the first B-picture of that GOP. As a result, when decoded, the video data (i.e., luminance and chrominance values for respective blocks) of the first macroblock MI1 of a row of macroblocks of the I-picture which begins that GOP will be copied as the video data of the second macroblock MB2 of that row in the first B-picture of the GOP, and will be copied as the video data of the third macroblock MB3 of that row in the second B-picture of the GOP. The first macroblock MB1 of that row in the first B-picture, and the first and second macroblocks MB1, MB2 of that row in the second B-picture will not have any corresponding video data, unless the respective MBAs of these have been assigned to respective zero-luminance macroblocks as described for the above embodiment.

The operation of the above embodiment could be simplified, such that the data of respective pictures are processed directly in the sequence of the encoded pictures without the need to consider the original temporal sequence. This could be done by arranging that the first picture to be selected in step S2 of FIG. 16A, when the processing is started, is always an I-picture, and setting successive predetermined values of the counter n which correspond to the temporal sequence values. Thus for example if the encoded data stream portions of respective pictures occur in the sequence:

I1,P4,B2,B3,P7,B5,B6,P10,B8,B9,I13,B11,B12, . . .

as described hereinabove, where the numerals indicate the original temporal sequence, then the values of n would be generated successively as 1, 4, 2, 3, 7, 5, . . . , rather than as 1, 2, 3, 4, 5, . . . at successive executions of step S2 in the flow diagram (FIG. 16A).

Figure 18:
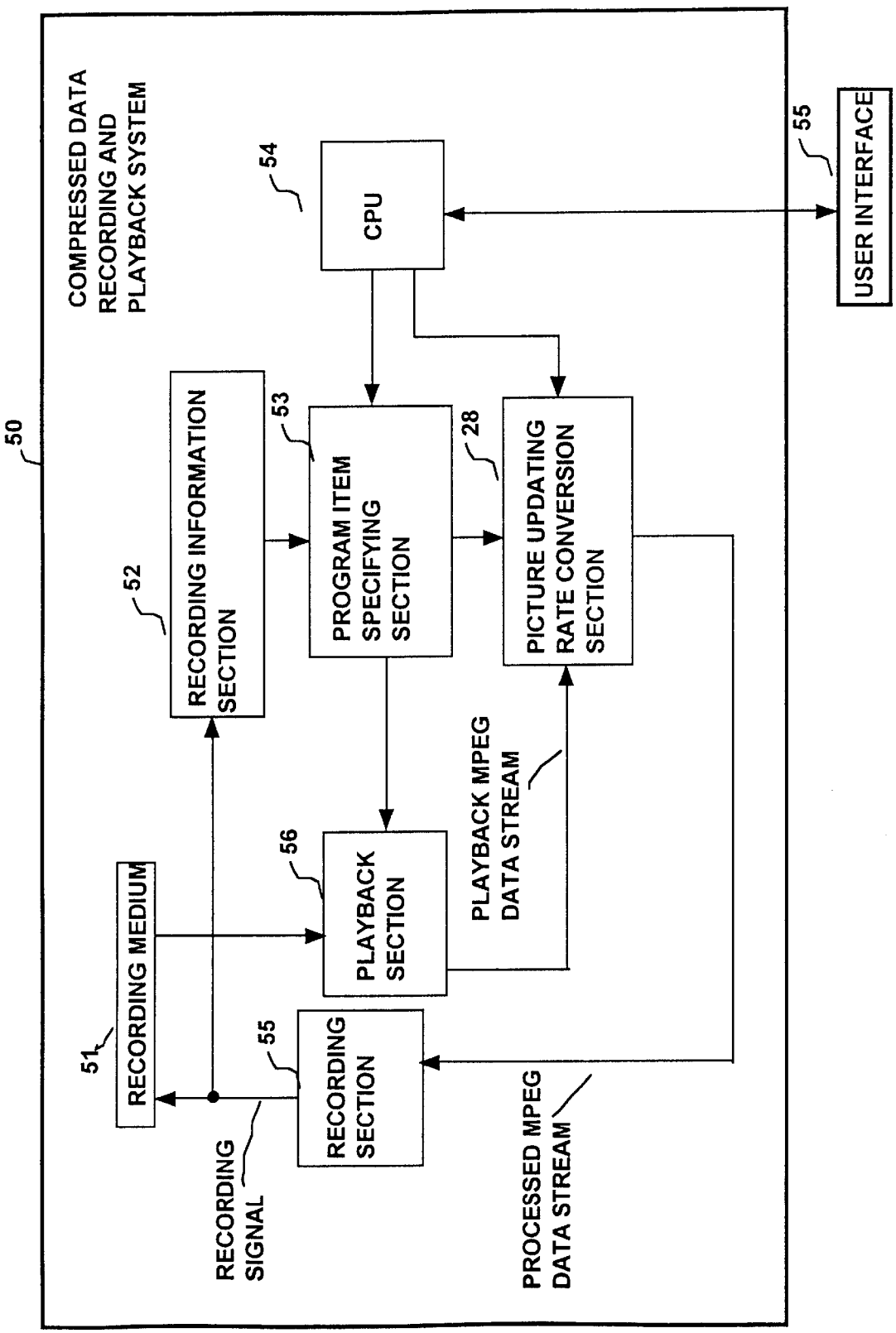
FIG. 18 is a general system block diagram of an embodiment of a recording system for recording and playback of MPEG-compressed video data, incorporating an apparatus according to the first embodiment, enabling processing and re-recording of a specific recorded item such as to reduce an amount of capacity which is occupied on a recording medium by that item.

A compressed data recording and playback system will now be described, for recording and playback of MPEG-encoded compressed data, which incorporates a compressed data processing apparatus according to the present invention such as that of the first embodiment of FIG. 1. When respective sets of data expressing various items, referred to in the following as program items, such as films, video clips, etc., are recorded on a recording medium such as magnetic tape, optical disk etc., of a recording and playback apparatus, a condition will frequently arise in which there is no space remaining available on the recording medium for recording of additional items. In the prior art when such a condition occurs, it has been necessary to erase one or more of the previously recorded items, if it is required to record new items. However it would be a useful feature of such an apparatus if one or more previously recorded program items could be converted into a form in which they occupy a reduced amount of space on the recording medium yet can still be played back to produce a sequence of images or sounds which will provide a recognizable reproduction of the item. With the present invention, in the case of a compressed data recording and playback system for MPEG-encoded compressed data, this can be achieved in a very simple manner, by using a compressed data processing apparatus such as that of the first embodiment described above. This will be described referring to FIG. 18, which is a conceptual system block diagram showing part of an embodiment of a compressed data recording and playback system 50, i.e., a part which relates to the present invention. In FIG. 18, the compressed data recording and playback system includes a recording medium 51 such as a magnetic tape or an optical or magnetic recording disk, a recording section 55 for receiving an MPEG data stream which expresses a program item and generating a corresponding recording signal for recording the data on the recording medium 51, and a playback section 56 for reading out from the recording medium 51 the data of a selected recorded item. The system also incorporates the picture updating rate conversion section 28 of the first embodiment shown in FIG. 1. It is assumed that recording information relating to each of the items which have already been recorded on the recording medium 51, including the recording positions on the recording medium, and possibly also including the respective dates and times of recording these items, is acquired based on the recording signal and is maintained by a program item recording information section 52, and that when an item is to be played back from the recording medium, the corresponding recording information is supplied from section 52 to a program item specifying section 53, so that the data (i.e., MPEG-encoded compressed data sequence) of the corresponding item to be located and read out from the recording medium 51, when such a read-out operation is specified by a command supplied from a CPU 54. Such a command might be generated in response to an input command supplied from a user interface 55.

With this embodiment, there are two possible ways in which the recovery of available recording space on the recording medium 51 can be implemented. As a first method, when the recording medium 51 has become full, and it is required to record data of an additional item, the recording information section 52 determines the oldest one of the previously recorded items, i.e. having the earliest recording date, and supplies that information to the program item specifying section 53. The program item specifying section 53 then initiates playback of the MPEG-encoded compressed data sequence for that item, which then begins to be supplied as a data stream to the picture updating rate conversion section 28. The picture updating rate conversion section 28 applies either the first or second modes of processing to that data stream (i.e., replacement of the data of each B-picture, or replacement of the data of each B-picture and also of each P-picture, by respective copy stream portions as described for the first embodiment), and the resultant modified MPEG-encoded compressed data stream is supplied from the picture updating rate conversion section 28 to the recording section 55 to be recorded on the recording medium 51. The originally recorded version of that program item can thus be erased from the recording medium 51 to thereby provide increased space for recording additional items.

As described for the first embodiment, such processing applied by the picture updating rate conversion section 28 results in a high degree of reduction of the amount of code constituting the entire MPEG-encoded compressed data stream that expresses a program item, so that a substantial amount of space on the recording medium 51 will thereby become available for recording the data of one or more additional items.

Alternatively, rather than automatically selecting the oldest of the previously recorded items for subjection to such processing by the picture updating rate conversion section 28, the system can be configured such that a user can input a command to the CPU 54 via the user interface 55, specifying an identifier of a previously recorded item which is to be subjected to such additional compression processing by the picture updating rate conversion section 28.

As can be understood from the above, this embodiment of the invention enables space to be made available on a recording medium for compressed digital data, by very simple processing, without the need to completely erase previously recorded items. For example, the additional compression processing applied by the picture updating rate conversion section 28 could be utilized to maintain old recorded items in a temporary status, prior to complete erasure of these items.

In addition, as described for the first embodiment, such a form of additional data compression by means of reducing the picture updating frequency does not result in any degradation of the display picture quality, since there is no lowering of image resolution.

What is claimed is:

1. A compressed data processing method for reducing a picture updating frequency of a stream of picture data sets expressing respective compression-encoded pictures, said stream including picture data sets each containing prediction information expressing a compression-encoded picture as being predictively encoded with respect to a predetermined corresponding other one of said compression-encoded pictures as a reference picture, the method comprising:

preparing beforehand a copy data set whose contents indicate a compression-encoded picture as being identical to said corresponding reference picture, and processing said stream of picture data sets to insert said copy data set to replace said prediction information in each of periodically occurring ones of said predictively encoded compression-encoded pictures, wherein said stream is an MPEG compressed video data stream in which each of said reference pictures is an I-picture or a P-picture and each of said predictively encoded pictures is a P-picture or a B-picture, each of said pictures for which prediction information is replaced is a B-picture, and wherein said copy data set includes motion vector information indicating that an overall amount of picture motion of a B-picture with respect to a corresponding temporally preceding reference picture or with respect to a corresponding temporally succeeding reference picture is zero and motion compensated prediction error information indicating that respective amounts of motion compensated prediction error for all macroblocks of said B-picture are zero, to thereby specify all macroblocks of said B-picture as being skipped macroblocks.

2. A compressed data processing method for reducing a picture updating frequency of a stream of picture data sets expressing respective compression-encoded pictures, said stream including picture data sets each containing prediction information expressing a compression-encoded picture as being predictively encoded with respect to a predetermined corresponding other one of said compression-encoded pictures as a reference picture, the method comprising:

preparing beforehand a copy data set whose contents indicate a compression-encoded picture as being identical to said corresponding reference picture, and processing said stream of picture data sets to insert said copy data set to replace said prediction information in each of periodically occurring ones of said predictively encoded compression-encoded pictures, wherein said stream is an MPEG compressed video data stream in which each of said reference pictures is an I-picture or a P-picture and each of said predictively encoded pictures is a P-picture or a B-picture, each of said pictures for which prediction information is replaced is a P-picture, and wherein said copy data set includes motion vector information indicating that an overall amount of picture motion of a P-picture with respect to a corresponding temporally preceding reference picture is zero and motion compensated prediction error information indicating that respective amounts of motion compensated prediction error for all macroblocks of said P-picture are zero, to thereby specify all macroblocks of said P-picture as being skipped macroblocks.

3. A compressed data processing method for reducing a picture updating frequency of a stream of picture data sets expressing respective compression-encoded pictures, said stream including picture data sets each containing prediction information expressing a compression-encoded picture as being predictively encoded with respect to a predetermined corresponding other one of said compression-encoded pictures as a reference picture, the method comprising:

preparing beforehand a copy data set whose contents indicate a compression-encoded picture as being identical to said corresponding reference picture, and processing said stream of picture data sets to insert said copy data set to replace said prediction information in each of periodically occurring ones of said predictively encoded compression-encoded pictures, wherein said compressed video data stream is an MPEG data stream in which each of said reference pictures is an I-picture or a P-picture and each of said predictively encoded pictures is a P-picture or a B-picture, wherein a B-picture copy data set and a P-picture copy data set are respectively prepared beforehand, wherein said B-picture copy data set includes motion vector information indicating that an overall amount of motion of a B-picture with respect to a corresponding temporally preceding reference picture or with respect to a corresponding temporally succeeding reference picture is zero and prediction error information indicating that respective amounts of motion compensated prediction error for all macroblocks of said B-picture are zero, to thereby specify all macroblocks of said B-picture as being skipped macroblocks, wherein said P-picture copy data set includes motion vector information indicating that an overall amount of motion of a P-picture with respect to a corresponding temporally preceding reference picture is zero and information indicating that respective amounts of motion compensated prediction error for all macroblocks of said P-picture are zero, to thereby specify all macroblocks of said P-picture as being skipped macroblocks, and wherein a first processing mode or a second processing mode can be selectively established such that in said first processing mode each of the B-pictures of said MPEG compressed video data stream is replaced by said B-picture copy data set and in said second processing mode, each of said B-pictures of said MPEG compressed video data stream is replaced by said B-picture copy data set and each of said P-pictures of said MPEG compressed video data stream is replaced by said P-picture copy data set.

4. A compressed data processing method for processing a selected part of an MPEG compressed video data stream to produce successive overall picture displacement in a predetermined direction for a final displayed picture corresponding to said selected part, said selected part being formed of a continuous sequence of predictively encoded pictures, the method comprising:

preparing beforehand copy information which specifies one specific predictive encoding direction for a predictively encoded picture and contains information indicating a specific non-zero magnitude of a motion vector which applies to all macroblocks of said predictively encoded picture, and a specific direction of said motion vector, and information indicating that each macroblock of said predictively encoded picture has zero amount of motion compensated prediction error; and processing each of said predictively encoded pictures in said selected part of the MPEG data stream to replace all motion vector information and motion compensated prediction error information of said each predictively encoded pictures with said copy information.

5. The method according to claim 4, wherein said selected part of the MPEG data stream contains a plurality of I-pictures, and wherein said method further comprises processing each of respective I-pictures which occur within said selected part of the MPEG data stream to produce a specific amount of displacement of a final displayed picture corresponding to said I-picture, with said amount of displacement being a continuation of successive amounts of final displayed picture displacement which are respectively produced as an effect of predictively encoded pictures which precede said each I-picture within a temporal sequence of the MPEG data stream.

6. A compressed data processing method for processing a selected part of an MPEG compressed video data stream to produce successive overall picture displacement in a predetermined direction for a final displayed picture corresponding to said selected part, said selected part being formed of a continuous succession of B-pictures and P-pictures, the method comprising:

preparing beforehand a P-picture copy data set which includes motion vector information for specifying a non-zero value of magnitude and a direction of a motion vector expressing an overall amount and direction of motion of a P-picture with respect to a corresponding temporally preceding reference picture, said copy data set further including motion compensated prediction error information which specifies zero amount of motion compensated prediction error for all macroblocks constituting said P-picture;

preparing beforehand a B-picture copy data set which includes motion vector information for specifying a non-zero value of magnitude and a direction of a motion vector expressing an overall amount and direction of motion of a B-picture with respect to a corresponding temporally preceding reference picture, said copy data set further including motion compensated prediction error information which specifies zero amount of motion compensated prediction error for all macroblocks constituting said B-picture; and processing each of respective P-pictures in said selected part of the MPEG data stream to replace all motion vector information and motion compensated prediction error information of said each P-picture with said P-picture copy data set, and processing each of respective B-pictures expressed in said selected part of the MPEG data stream to replace all motion vector information and motion compensated prediction error information of said each B-picture with said B-picture copy data set.

7. The method according to claim 6, wherein said selected part of the MPEG data stream contains a plurality of I-pictures, and wherein said method further comprises processing each of respective I-pictures which occur within said selected part of the MPEG data stream to produce a specific amount of displacement of a final displayed picture corresponding to said I-picture, which said amount of displacement being a continuation of successive identical amounts of final displayed picture displacement which are respectively produced as an effect of B-pictures and P-pictures which precede said each I-picture within a temporal sequence of the MPEG data stream.

* * * * *